United States Patent
Omata et al.

(10) Patent No.: US 9,419,554 B2
(45) Date of Patent: Aug. 16, 2016

(54) CONTROL DEVICE OF AC MOTOR

(71) Applicant: DENSO CORPORATION, Kariya, Aichi-pref. (JP)

(72) Inventors: Ryuji Omata, Anjo (JP); Takahumi Oowada, Kariya (JP)

(73) Assignee: DENSO CORPORATION, Kariya (JP)

( * ) Notice: Subject to any disclaimer, the term of this patent is extended or adjusted under 35 U.S.C. 154(b) by 195 days.

(21) Appl. No.: 14/458,503

(22) Filed: Aug. 13, 2014

(65) Prior Publication Data

US 2015/0054432 A1 Feb. 26, 2015

(30) Foreign Application Priority Data

Aug. 20, 2013 (JP) ................................. 2013-170193

(51) Int. Cl.
*H02P 21/00* (2016.01)
*H02P 21/14* (2016.01)

(52) U.S. Cl.
CPC ....................................... *H02P 21/14* (2013.01)

(58) Field of Classification Search
CPC ..... H02P 21/14; H02P 21/00; H02P 2207/05; H02P 21/141; H02P 21/10; H02P 23/14
USPC ............... 318/400.01, 400.02, 400.2, 400.22, 318/400.26, 400.34, 400.35, 722, 432, 437
See application file for complete search history.

(56) References Cited

U.S. PATENT DOCUMENTS

| | | | |
|---|---|---|---|
| 7,598,698 B2 * | 10/2009 | Hashimoto | ................... 318/798 |
| 7,750,595 B2 * | 7/2010 | Yamada | .............. H02P 23/0027 318/767 |
| 7,911,165 B2 * | 3/2011 | Peyras | ................... H02P 21/06 318/400.02 |
| 2008/0079385 A1 | 4/2008 | Hashimoto et al. | |
| 2010/0123418 A1 * | 5/2010 | Itoh | ..................... H02P 21/0089 318/400.02 |
| 2013/0214709 A1 * | 8/2013 | Omata | .................. H02P 21/148 318/400.02 |
| 2013/0214711 A1 | 8/2013 | Omata et al. | |
| 2014/0117893 A1 | 5/2014 | Omata et al. | |

FOREIGN PATENT DOCUMENTS

JP 2004-159391 6/2004

OTHER PUBLICATIONS

Omata et al., U.S. Appl. No. 14/458,516, filed Aug. 13, 2014.
Omata et al., U.S. Appl. No. 14/458,489, filed Aug. 13, 2014.

* cited by examiner

*Primary Examiner* — Bentsu Ro
*Assistant Examiner* — Thai Dinh
(74) *Attorney, Agent, or Firm* — Nixon & Vanderhye P.C.

(57) ABSTRACT

A control device of a three-phase AC motor includes: an inverter for driving the motor; a current sensor for sensing a sensor phase current of the motor; and a controller for controlling the motor. The controller includes: a current estimation device for estimating d-axis and q-axis current estimated values based on the sensor phase current and an electric angle of the motor; and a zero-crossing interpolation device for interpolating the d-axis and q-axis current estimated values by fixing the d-axis and q-axis current estimated values when the sensor phase current is in a zero cross range, which includes a zero point, so that the sensor phase current crosses the zero point, and for outputting interpolated d-axis and q-axis current estimated values as fixed d-axis and q-axis values, which are used for a feedback control relating to current flowing through the motor.

5 Claims, 13 Drawing Sheets

CONTROL DEVICE OF AC MOTOR

CROSS REFERENCE TO RELATED APPLICATION

This application is based on Japanese Patent Application No. 2013-170193 filed on Aug. 20, 2013, the disclosure of which is incorporated herein by reference.

TECHNICAL FIELD

The present disclosure relates to a control device of an AC motor that senses a phase current of one phase among three phases by a current sensor and that controls a current flowing through an AC motor.

BACKGROUND

In recent years, from a social requirement of a lower fuel consumption and a less exhaust emission, an electric vehicle and a hybrid vehicle, each of which is mounted with an AC motor as a power source of a vehicle, is drawing attention. For example, in some of the hybrid vehicles, a DC power source made of a secondary battery or the like and an AC motor are connected to each other via an electric power conversion unit constructed of an inverter and the like, and a DC voltage of the DC power source is converted into an AC voltage by the inverter to thereby drive the AC motor.

In the control device of the AC motor mounted in the hybrid vehicle and the electric vehicle has been known the following technology (refer to, for example, a patent document 1): that is, a current sensor for sensing a phase current is provided only in one phase; and a current estimated value estimated on the basis of a current sensed value of the one phase is fed back, whereby a current flowing through an AC motor is controlled. Since the current sensor is provided only in the one phase, the number of the current sensor is reduced and the size of a portion near a three-phase output terminal of an inverter is reduced and the cost of a control system of the AC motor is reduced.

In the technique disclosed in the patent document 1, on the basis of a current sensed value of one phase (for example, U phase), which is sensed by the current sensor, and a d axis current command value and a q axis current command value and an electric angle of an AC motor, the current estimated values of the other two phases (for example, V phase and W phase) are calculated.

Specifically, an angle ($\theta$), which is formed by a rotator of the AC motor and a U phase axis of a stator, is added to a command current phase angle ($\alpha$), which is acquired from a d axis current command value id* and a q axis current command value iq* to thereby find a U phase current phase angle $\theta'(=\theta+\alpha)$. Then, a current amplitude Ia is calculated by the following formula (91) by the use of the U phase current phase angle $\theta'$ and a U phase current sensed value Iu. Then, a sin value at an electric angle shifted by $\pm 120[°]$ from the U phase current phase angle $\theta'$ is multiplied by the current amplitude Ia to thereby calculate the current estimated values Iv, Iw of the two other phases by the following formulas (92), (93).

$$Ia = Iu / [\sqrt{(1/3)} \times \{-\sin(\theta')\}] \quad (91)$$

$$Iv = \sqrt{(1/3)} \times Ia \times \{-\sin(\theta'+120°)\} \quad (92)$$

$$Iw = \sqrt{(1/3)} \times Ia \times \{-\sin(\theta'+240°)\} \quad (93)$$

Then, the current sensed value Iu of one phase and the current estimated values Iv, Iw of the other two phases are dq transformed to thereby calculate a d axis current estimated value Id and a q axis current estimated value Iq. Then, the current flowing through the AC motor is controlled by a current feedback control mode of feeding back the d axis current estimated value Id and the q axis current estimated value Iq to a d axis current command value Id* and a q axis current command value Iq*.

In the technique of the patent document 1, when the U phase current phase angle $\theta'=0[°]$ and $\sin(\theta')=0$, in the calculation of the current amplitude Ia by the formula (91), Iu is divided by 0, that is, "zero division" is caused and hence the current amplitude Ia cannot be calculated correctly. For this reason, the current estimated values Iv, Iw of the other two phases cannot be calculated correctly. However, the patent document 1 never refers to measures against this "zero division".

Further, when the current sensed value Iu=0 [A], from the formulas (92) and (93), the current estimated values Iv, Iw of the other two phases are calculated as follows: Iv=0 [A] and Iw=0 [A]. Hence, there is a possibility that the control of the AC motor could not be performed.

Also in a technique other than the patent document 1, in the case where a variable to become 0 in a specified phase or at a specified timing is included, there is a possibility that a correct calculation could be impaired by "the zero division" of dividing something by 0 or "the zero multiplication" of multiplying something by 0 and hence the current estimated value could be varied.

[Patent document 1] JP-A 2004-159391

SUMMARY

It is an object of the present disclosure to provide a control device of an AC motor that senses a phase current of one phase among three phases by a current sensor and that controls a current flowing through an AC motor and that prevents a current estimated value from being varied by "zero division" or "zero multiplication" in a calculation formula.

According to an aspect of the present disclosure, a control device of a three phase AC motor includes: an inverter for driving the AC motor; a current sensor for sensing a current flowing in a sensor phase among three phases of the AC motor as a sensor phase current; and a controller for switching on and off a plurality of switching elements, which provide the inverter, in order to control a current flowing through the AC motor. The controller includes: a current estimation device for estimating a d-axis current estimated value and a q-axis current estimated value based on the sensor phase current and an electric angle of the AC motor; and a zero-crossing interpolation device for interpolating the d-axis current estimated value and the q-axis current estimated value, which are estimated by the current estimation device, by fixing the d-axis current estimated value and the q-axis current estimated value when the sensor phase current is in a zero cross range, which includes a zero point, so that the sensor phase current crosses the zero point, and for outputting an interpolated d-axis current estimated value and an interpolated q-axis current estimated value values as a fixed d-axis value and a fixed q-axis value, which are used for a feedback control relating to the current flowing through the AC motor.

According to the above device, when the sensor phase current crosses zero, the d axis current estimated value and the q axis estimated value are interpolated, so that it is possible to prevent "zero division" of dividing something by 0 or "zero multiplication" of multiplying something by 0 from being caused in a current estimation formula. Hence, it is possible to prevent the current estimated values from being varied when the sensor phase current crosses zero.

By zero-crossing interpolating the d axis current estimated value and the q axis current estimated value "directly", it is possible to prevent the d axis current estimated value and the q axis current estimated value from being varied with more reliability as compared with a case where the d axis current estimated value and the q axis current estimated value are indirectly interpolated. Hence, not only in the feedback control using the d axis current estimated value and the q axis current estimated value but also other control or determination performed by the use of the d axis current estimated value and the q axis current estimated value, it is possible to avoid the effect of an erroneous determination and a malfunction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, embodiments of a control device of an AC motor according to the present disclosure will be described on the basis of the drawings.

First, a construction common to a plurality of embodiments will be described with reference to FIG. 1 and FIG. 2. An electric motor control device 10 as "a control device of an AC motor" according to an embodiment is applied to an electric motor drive system 1 for driving a hybrid vehicle.

[Construction of Control Device of AC Motor]

Figure 1:
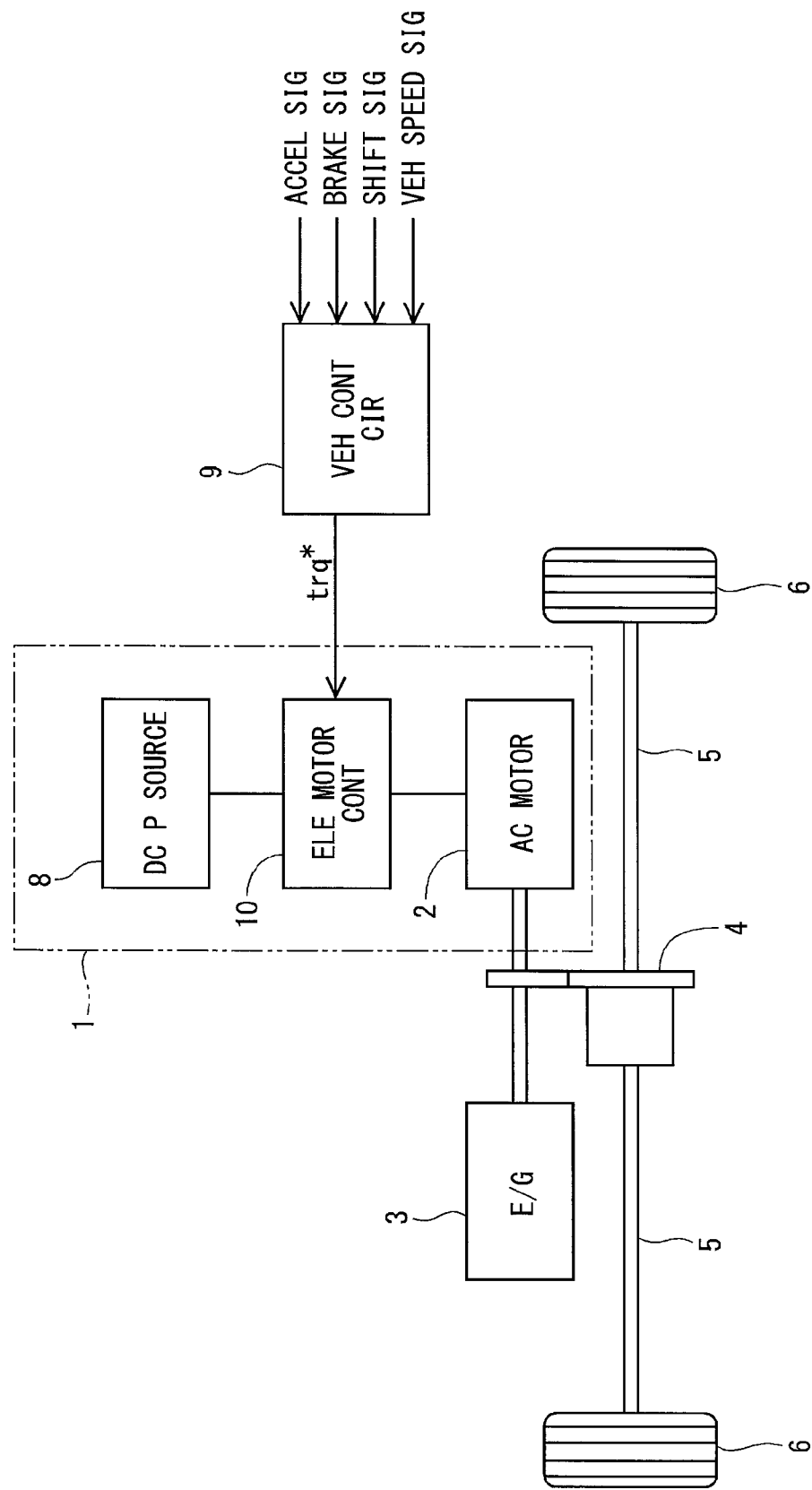
FIG. 1 is a diagram to show a construction of an electric motor drive system to which a control device of an AC motor according to an embodiment of the present disclosure.

As shown in FIG. 1, the electric motor drive system 1 has an AC motor 2, a DC power source 8, and the electric motor control device 10. The AC motor 2 is an electric motor for generating torque for driving the driving wheels 6 of an electrically driven vehicle.

The AC motor 2 of the present embodiment is a three-phase AC motor of a permanent magnet synchronous type.

The electrically driven vehicle includes a vehicle for driving the driving wheels 6 by an electric energy such as a hybrid vehicle, an electric vehicle, and a fuel cell electric vehicle. The electrically driven vehicle of the present embodiment is a hybrid vehicle provided with an engine 3 and the AC motor 2 is a so-called motor generator (designated by "MG" in the drawings) having a function as an electric motor for generating torque to drive the driving wheels 6 and a function as a generator which is driven by the kinetic energy of the vehicle, transmitted from the engine 3 and the driving wheels 6, and which can generate electricity.

The AC motor 2 is coupled to an axle 5 via a gear 4, for example, a transmission. In this way, a driving force of the AC motor 2 rotates the axle 5 via the gear 4 to thereby drive the driving wheels 6.

The DC power source 8 is an electricity storage device that can charge and discharge electricity, for example, a secondary battery such as a nickel metal hydride battery or a lithium ion battery, and an electric double-layer capacitor. The DC power source 8 is connected to an inverter 12 (refer to FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided therein with a CPU, a ROM, an I/O, and a bus line for connecting these elements, all of which are not shown in the drawings. The vehicle control circuit 9 controls the whole of the electrically driven vehicle by software processing, which is performed by executing previously stored programs by the CPU, and by hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, a shift signal from a shift switch, and a vehicle speed signal relating to a speed of the vehicle, all of which are not shown in the drawings. Further, the vehicle control circuit 9 detects a driving state of the vehicle on the basis of these acquired signals and outputs a torque command value trq* responsive to the driving state to the electric motor control device 10. Further, the vehicle control circuit 9 outputs a command signal to an engine control circuit (not shown) for controlling the drive of the engine 3.

Figure 2:
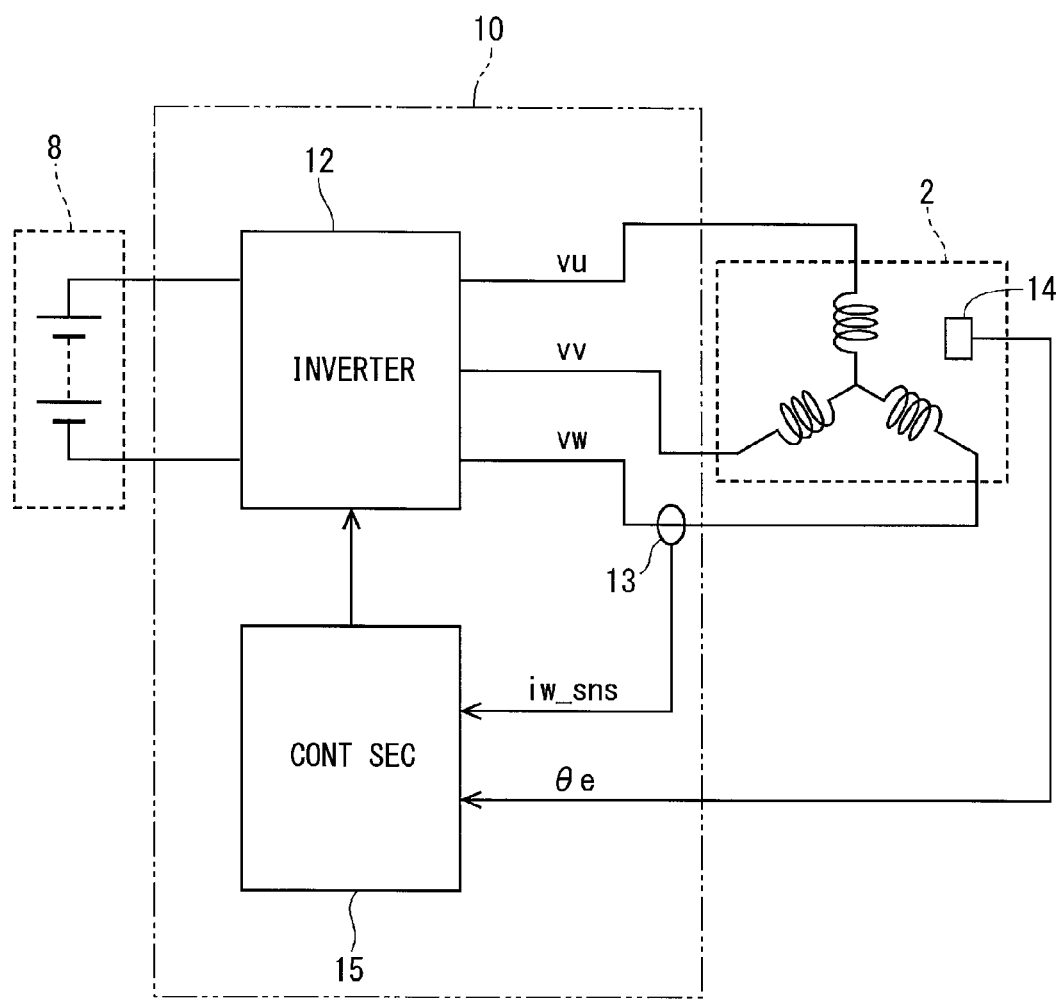
FIG. 2 is a general construction diagram of the control device of an AC motor according to the embodiment of the present disclosure.

As shown in FIG. 2, the electric motor control device 10 includes the inverter 12, a current sensor 13, and a control section 15 as "a control means".

The inverter 12 has a boost voltage of the DC power source by a boost converter (not shown) inputted thereto as a system voltage VH. The inverter 12 has six switching elements (not shown) connected in a bridge mode. As to the switching element, for example, an IGBT (Insulated Gate Bipolar Transistor), a MOS (Metal Oxide Semiconductor) transistor, and a bipolar transistor can be used. The switching elements are switched on and off on the basis of PWM signals UU, UL, VU, VL, WU, WL outputted from a PWM signal generation part 25 of the control section 15, whereby the drive of the AC motor 2 is controlled on the basis of three phase AC voltages vu, vv, vw to be impressed on the AC motor 2

The current sensor 13 is provided in any one phase of the AC motor 2. In the present embodiment, the current sensor 13 is provided in a W phase. Hereinafter, the W phase in which the first current sensor 13 is provided is referred to as "a sensor phase". The current sensor 13 senses a phase current of the W phase as a current sensed value iw_sns of the sensor phase and outputs the current sensed value iw_sns to the control section 15.

Hereinafter, in the description of the present embodiment, the description will be made on the premise of a construction in which the sensor phase is the W phase. However, in the other embodiments, a U phase or a V phase may be the sensor phase.

A rotation angle sensor 14 is provided near a rotor (not shown) of the AC motor 2 and senses an electric angle θe and outputs the sensed electric angle θe to the control section 15. Further, the number of revolutions N of a rotor of the AC motor 2 is calculated on the basis of the electric angle θe sensed by the rotation angle sensor 14. Hereinafter, "the number of revolutions N of the rotor of the AC motor 2" is simply referred to as "the number of revolutions N of the AC motor 2".

The rotation angle sensor 14 of the present embodiment is a resolver. However, in the other embodiments, the rotation angle sensor 14 may be other kind of sensor, for example, a rotary encoder.

The control section 15 is constructed of a microcomputer and the like and is provided therein with a CPU, a ROM, an I/O, and a bus line for connecting these elements, all of which are not shown in the drawings. The control section 15 controls an action of the AC motor 2 by software processing, which is performed by executing previously stored programs by the CPU, and by hardware processing, which is performed by a dedicated electronic circuit.

According to the number of revolutions N of the AC motor 2 based on the electric angle θe sensed by the rotation angle sensor 14 and to a torque command value trq* from the vehicle control circuit 9, the electric motor control device 10 drives the AC motor 2 as an electric motor, whereby the AC motor 2 performs "a powering operation as an electric motor" and consumes electricity, or drives the AC motor 2 as a generator, whereby the AC motor 2 performs "a regenerating operation as a generator" and generates electricity. Specifically, according to the number of revolutions N and whether the torque command value trq* is plus or minus, the electric motor control device 10 switches the action of the AC motor 2 into the following four patterns:

<1. Normal rotation/powering operation> when the number of revolutions N is plus and the torque command value trq* is plus, the AC motor 2 consumes electricity;

<2. Normal rotation/regenerating operation> when the number of revolutions N is plus and the torque command value trq* is minus, the AC motor 2 generates electricity;

<3. Reverse rotation/powering operation> when the number of revolutions N is minus and the torque command value trq* is minus, the AC motor 2 consumes electricity; and <4. Reverse rotation/regenerating operation> when the number of revolutions N is minus and the torque command value trq* is plus, the AC motor 2 generates electricity.

In the case where the number of revolutions N>0 (normal rotation) and the torque command value trq*>0, or the number of revolutions N<0 (reverse rotation) and the torque command value trq*<0, the inverter 12 converts a DC electricity supplied from the DC power source 8 to an AC electricity by the switching operation of the switching elements and supplies the AC electricity to the AC motor 2, whereby the AC motor 2 is driven in such a way as to output torque (to perform a powering operation).

On the other hand, in the case where the number of revolutions N>0 (normal rotation) and the torque command value trq*<0, or the number of revolutions N<0 (reverse rotation) and the torque command value trq*>0, the inverter 12 converts an AC electricity generated by the AC motor 2 to a DC electricity by the switching operation of the switching elements and supplies the DC electricity to the DC power source 8, whereby the AC motor 2 performs a regenerating operation.

[Construction and Operation & Effect of Control Section]

Hereinafter, the construction and the operation, and effect of the control section 15 will be described for each embodiment. A control section 151 of a first embodiment controls a current flowing through the AC motor 2 by a current feedback control mode, whereas a control section 153 of a second embodiment controls a current flowing through the AC motor 2 by a torque feedback control mode.

First Embodiment

The control section 151 of the first embodiment of the present disclosure will be described with reference to FIG. 3 to FIG. 10.

The current feedback control mode is a control mode for feeding back a d axis current estimated value id_est and a q axis current estimated value iq_est to a d axis current command value id* and a q axis current command value iq*, respectively, and includes a so-called sine wave control mode and an overmodulated control mode.

Figure 3:
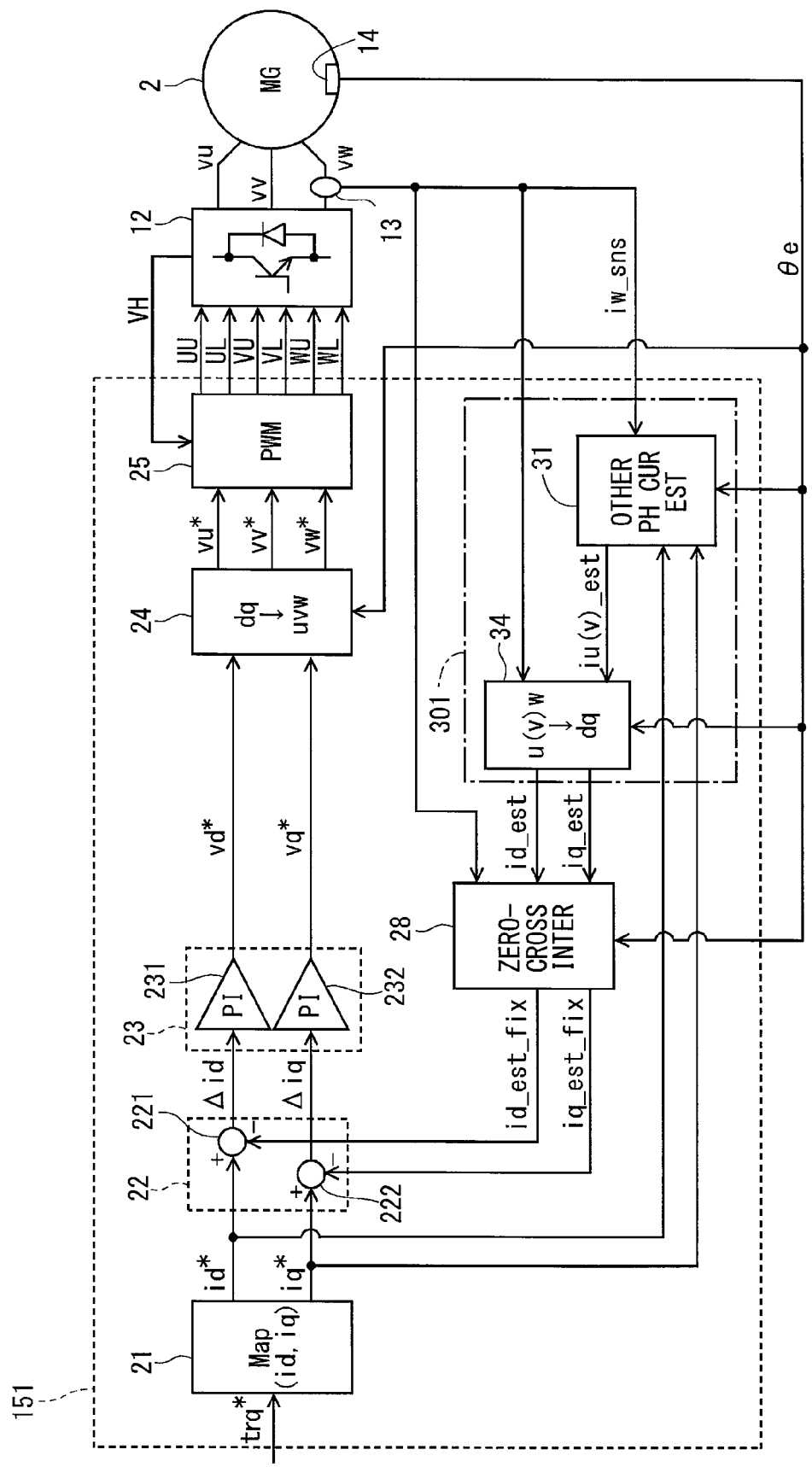
FIG. 3 is a block diagram to show a construction of a control section of a current feedback control mode according to a first embodiment of the present disclosure.

As shown in FIG. 3, the control section 151 includes a dq axis current command value operation part 21, a current subtractor 22, a PI operation part 23, an inverse dq transformation part 24, a PWM signal generation part 25, a current estimation part 301, and a current estimated value zero-crossing interpolation part 28 as "a zero-crossing interpolation means".

The dq axis current command value operation part 21 operates a d axis current command value id* and a q axis command value iq* in a rotary coordinate system (d-q coordinate system) of the AC motor 2 on the basis of the torque command value trq* acquired from the vehicle control circuit 9. In the present embodiment, the d axis current command value id* and the q axis command value iq* are operated with reference to a map stored previously. In the other embodiments, the dq axis current command value operation part 21 may be constructed in such a way that the d axis current command value id* and the q axis command value iq* are operated from a mathematical formula or the like.

The current subtractor 22 has a d axis current subtractor 221 and a q axis current subtractor 222. The d axis current subtractor 221 calculates a d axis current deviation Δid of a difference between the d axis current estimated value id_est, which is calculated by the current estimation part 301 and is fed back, and the d axis current command value id*. Further, the q axis current subtractor 222 calculates a q axis current deviation Δiq of a difference between the q axis current estimated value iq_est, which is calculated by the current estimation part 301 and is fed back, and the q axis current command value iq*.

The PI operation part 23 has a d axis PI operation part 231 and a q axis PI operation part 232. The d axis PI operation part 231 calculates a d axis voltage command value vd* by a PI operation in such a way that the d axis current deviation Δid converges to 0 so as to make the d axis current estimated value id_est follow the d axis current command value id*. Further, the q axis PI operation part 232 calculates a q axis voltage command value vd* by a PI operation in such a way that the q axis current deviation Δiq converges to 0 so as to make the q axis current estimated value iq_est follow the q axis current command value iq*.

The inverse dq transformation part 24 transforms the d axis voltage command value (fixed value) vd*_fix and the q axis voltage command value (fix value) vq*_fix to a U phase voltage command value vu*, a V phase voltage command value vv*, and a W phase voltage command value vw* on the basis of the electric angle θe acquired from the rotation angle sensor 14.

The PWM signal generation part 25 calculates PWM signals UU, UL, VU, VL, WU, WL, which relate to switching on or off the switching elements of the inverter 12, on the basis of the three phase voltage command values vu*, vv*, vw* and the system voltage VH impressed on the inverter 12. When the switching elements of the inverter 12 are switched on or off on the basis of the PWM signals UU, UL, VU, VL, WU, WL, the three phase AC voltages vu, vv, vw are generated. Then, when the three phase AC voltages vu, vv, vw are impressed on the AC motor 2, the drive of the AC motor 2 is controlled in such a way that a torque corresponding to the torque command value trq* is outputted.

The current estimation part 301 has another phase current estimation part 31 and a dq transformation part 34. In the first place, in the case where an electric motor control device having the current sensors 13 provided in two phases, a current of one remaining phase in which the current sensor 13 is not provided can be easily calculated by the Kirchhoff's law. In contrast to this, in the present embodiment having the current sensor 13 provided only in one phase (W phase), the other phase current estimation part 31 of the current estimation part 301 estimates a current of one phase among two phases of the U phase and the V phase in which the current sensor 13 is not provided. Hereinafter, a phase in which a current is estimated is referred to as "an estimated phase". The description of the present embodiment will be made on the premise of a construction in which the estimated phase is the U phase.

The dq transformation part 34 dq transforms the current sensed value iw_sns of the sensor phase and a current estimated value iu_est of the estimated phase, which is estimated by the other phase current estimation part 31, to thereby calculate a d axis current estimated value id_est and a q axis estimated value iq_est.

In this regard, in FIG. 3, a case in which the estimated phase is the V phase will be shown in a parenthesis such as [iu(v)_est] for the other phase current estimated value outputted to the dq transformation part 34 from the other phase current estimation part 31 and, in the same way, [u(v)w→dq] for the dq transformation part 34.

Next, a construction will be described in which the other phase current estimation part 31 estimates a current estimated value iu_est of the estimated phase. Here, in the current feedback control mode, the d axis current command value id* and the q axis current command value iq* are used for the control. Hence, the other phase current estimation part 31 of the present embodiment calculates the current estimated value iu_est of the estimated phase on the basis of the information on the current sensed value iw_sns of the sensor phase, the electric angle θe, and the d axis current command value id* and the q axis current command value iq*.

In particular, the present embodiment is characterized in that the current estimated value iu_est of the estimated phase is calculated from a sensor phase reference current phase θx calculated on the basis of an α axis current iα and a β axis current iβ in an α-β coordinate system.

Figure 4:
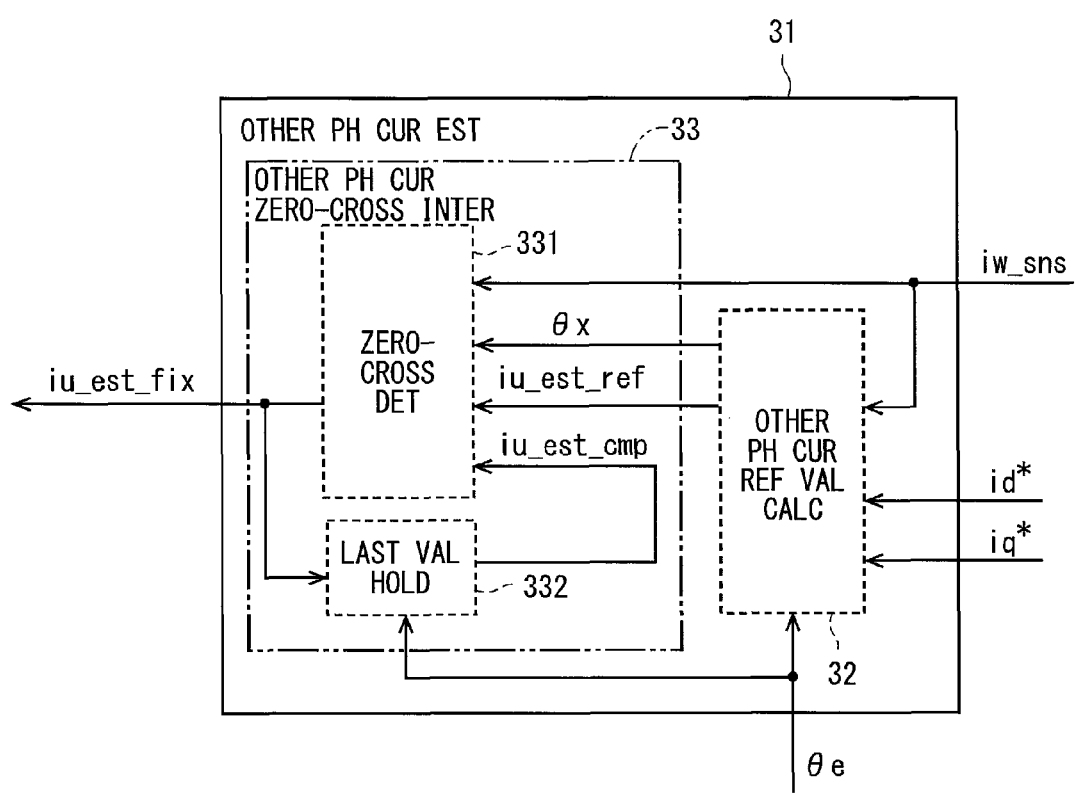
FIG. 4 is a block diagram to show a construction of another phase current estimation part of FIG. 3.

The other phase current estimation part 31 of the present embodiment, as shown in a detailed construction of FIG. 4, includes another phase current reference value calculation part 32 and another phase current zero-crossing interpolation part 33.

The other phase current reference value calculation part 32 acquires the d axis current command value id* and the q axis current command value iq*, which are calculated by the dq axis current command value operation part 21, and the electric angle θe, and calculates a current command value iv* of the V phase, which is not the estimated phase, by an inverse dq transformation.

In this regard, in the case where the estimated phase is the V phase in the other embodiment, the other phase current reference value calculation part 32 may calculate a current command value iu* of the U phase or may calculate the current command values iu*, iv* of the U phase and the V phase.

Next, the other phase current reference value calculation part 32 calculates the α axis current iα and the β axis current iβ by the use of the V phase current command value iv* calculated in this manner and the current sensed value iw_sns of the sensor phase and then calculates the sensor phase reference current phase θx defined in the α-β coordinate system.

Figure 5:
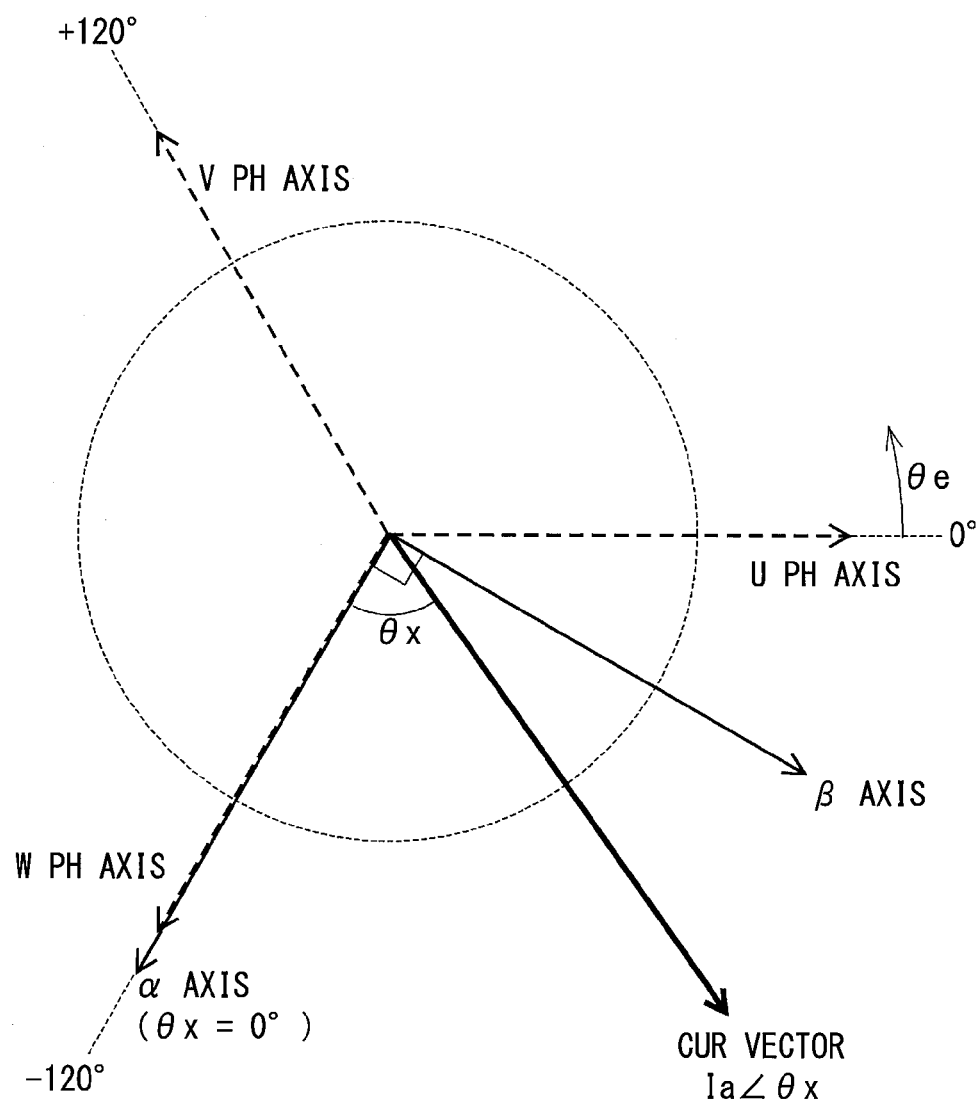
FIG. 5 is a chart to illustrate a fixed coordinate system ($\alpha$-$\beta$ coordinate system) based on a sensor phase.

As shown in FIG. 5, an α axis corresponds to an axis of the W phase of the sensor phase and a β axis is orthogonal to the α axis. The sensor phase reference current phase θx is an angle, which is formed by the α axis and a current vector (Ia ∠ θx) of a current amplitude Ia and is synchronous with the current sensed value iw_sns of the sensor phase. In the state of a normal rotation and a powering operation of a plus torque, the sensor phase reference current phase θx when a waveform of a W phase current iw crosses zero from minus to plus is 0[°], whereas the sensor phase reference current phase θx when the waveform of the W phase current iw crosses zero from plus to minus is 180[°].

Here, the α axis current iα and the β axis current iβ, which are used for calculating the sensor phase reference current phase θx, will be described. When the α axis current iα and the β axis current iβ are expressed by the use of the respective phase currents iu, iv, iw, the α axis current iα and the β axis current iβ are shown by formulas (1), (2). Here, K in the formulas is a transformation coefficient.

[Mathematical formula 1]

$$i\alpha = K \times \left(iw - \frac{1}{2} \times iu - \frac{1}{2} \times iv\right) \quad (1)$$

$$i\beta = K \times \left(\frac{\sqrt{3}}{2} \times iu - \frac{\sqrt{3}}{2} \times iv\right) \quad (2)$$

Further, as described above, the sum of instantaneous values of three phase currents iu, iv, iw becomes 0 by the Kirchhoff's law, that is, the following formula (3) holds.

$$iu+iv+iw=0 \quad (3)$$

Here, when the formula (1) is deformed by the use of the formula (3), the following formula (4) is obtained.

[Mathematical formula 2]

$$i\alpha=K\times 3/2\times iw \quad (4)$$

In other words, as shown in the formula (4), the α axis current iα can be calculated on the basis of only the W phase current iw of the sensor phase. Here, when the current sensed value iw_sns of the sensor phase is used as the W phase current iw, an α axis current sensed value iα_sns can be expressed by a formula (5).

[Mathematical formula 3]

$$i\alpha\_sns = K \times 3/2 \times iw\_sns \quad (5)$$

Further, when the formula (2) is referred to, in the case where the current command value iu* is used as the U phase current iu and the current command value iv* is used as the V phase current iv, a β axis current estimated value iβ_est can be expressed by a formula (6).

[Mathematical formula 4]

$$i\beta\_est = K \times \left( \frac{\sqrt{3}}{2} \times iu^* - \frac{\sqrt{3}}{2} iv^* \right) \quad (6)$$

In the formula (6), the β axis current estimated value iβ_est is calculated from the current command values iu*, iv* and does not include a component of the current sensed value iw_sns of the sensor phase, which is sensed by the current sensor 13. For this reason, the β axis current estimated value iβ_est calculated by the formula (6) is not always information reflecting an actual current with high accuracy. Hence, when the formula (6) is deformed in such a way that the β axis current estimated value iβ_est includes the current sensed value iw_sns of the sensor phase by the use of the Kirchhoff's law (formula (3)), the following formula (7) can be obtained.

[Mathematical formula 5]

$$i\beta\_est = K \times \left( -\sqrt{3} \times iv^* - \frac{\sqrt{3}}{2} iw\_sns \right) \quad (7)$$

As shown by the formula (7), when the β axis current estimated value iβ_est is made to include the current sensed value iw_sns of the sensor phase, which is an actual current, it is possible to respond to variations in control and hence to narrow a region in which a W phase axis component is small and is hard to converge. Hence, the accuracy of the β axis current estimated value iβ_est can be improved. In other words, a sensing accuracy of the sensor phase reference current phase θx calculated by the use of the β axis current estimated value iβ_est can be improved.

Subsequently, the sensor phase reference current phase θx is calculated by a formula (8) on the basis of the α axis current sensed value iα_sns calculated by the formula (5) and the β axis current estimated value iβ_est calculated by the formula (6) or the formula (7).

Here, in the case where the sensor phase reference current phase θx is calculated by an arc tangent function (tan$^{-1}$) by the use of the formula (8), depending on the definition of the α axis current iα and the β axis current iβ, there could be a case where the sensor phase reference current phase θx does not become an angle synchronous with the sensor phase (W phase). This is caused by the definition of an axis (for example, an interchange or a sign inversion of the α axis and the β axis).

In this case, it is assumed that the calculation method can be changed as required in such a way that: the sensor phase reference current phase θx when the current sensed value iw_sns of the sensor phase in a normal rotation and a normal torque crosses zero from minus to plus becomes 0[°]; and the sensor phase reference current phase θx when the current sensed value iw_sns of the sensor phase crosses zero from plus to minus becomes 180[°], in other words, in such a way that the sensor phase reference current phase θx becomes an angle synchronous with the sensor phase current sensed value iw_sns. For example, the sensor phase reference current phase θx may be calculated after operating the signs of the α axis current iα and the β axis current iβ, or the α axis current iα and the β axis current iβ may be interchanged between them, or a phase difference 90[°] caused by an orthogonal relationship between the α axis and the β axis may be added to or subtracted from the calculated sensor phase reference current phase θx.

[Mathematical formula 6]

$$\theta x = \tan^{-1} \left( \frac{i\beta\_est}{i\alpha\_sns} \right) \quad (8)$$

Next, the current estimated value iu_est of the U phase of the estimated phase is calculated by the use of the sensor phase reference current phase θx and the current sensed value iw_sns of the sensor phase. Here, when the current sensed value iw_sns of the sensor phase and the current estimated value iu_est of the U phase of the estimated phase are expressed by the use of the sensor phase reference current phase θx, because a phase difference between the respective phases is 120[°], the current sensed value iw_sns of the sensor phase and the current estimated value iu_est of the U phase of the estimated phase are expressed by formulas (9) and (10), respectively. Here, Ia in the formulas (9), (10) is a current amplitude.

$$iw\_sns = Ia \times \sin(\theta x) \quad (9)$$

$$iu\_est = Ia \times \sin(\theta x - 120°) \quad (10)$$

Further, when the formula (10) is deformed by the use of an addition theorem, the U phase current estimated value iu_est can be expressed by the following formula (11) by the use of the sensor phase reference current phase θx and the current sensed value iw_sns of the sensor phase.

[Mathematical formula 7]

$$\begin{aligned}
iu\_est &= Ia \times \sin(\theta x - 120°) \\
&= -\frac{1}{2} \times Ia \times \sin(\theta x) - \frac{\sqrt{3}}{2} \times Ia \times \cos(\theta x) \\
&= -\frac{1}{2} \times iw\_sns - \frac{\sqrt{3}}{2} \times \frac{Ia \times \sin(\theta x)}{\tan(\theta x)} \\
&= \left\{ -\frac{1}{2} - \frac{\sqrt{3}}{2} \times \frac{1}{\tan(\theta x)} \right\} \times iw\_sns
\end{aligned} \quad (11)$$

Further, when an estimation coefficient iu_kp is defined by a formula (12), the U phase current estimated value iu_est can be expressed also by a formula (13) by the use of the estimation coefficient iu_kp. Here, the estimation coefficient iu_kp may be directly operated by a formula (12), or a part or all of the formula (12) may be mapped in advance on the basis of the sensor phase reference current phase θx and then the estimation coefficient iu_kp may be calculated with reference to this map.

In the case where the control section 151 is constructed of a conventional electronic control circuit (microcomputer), when the control section 151 is mounted with an operation formula, the operation formula is processed not in continuous time but in discrete time and hence the sensor-sensed value and the respective operated values are treated also as discrete values based on a specified resolution (LSB). Here, "the control section 151 is mounted with an operation formula" means that the control section 151 includes a program of software and a construction of a hardware circuit. In order to avoid multiplication and division of large processing load, it is effective to map the estimation coefficient iu_kp or a term of {1/tan (θx)} in the estimation coefficient iu_kp by using the sensor phase reference current phase θx as an argument. This mapping makes it easy to apply the control section 151 to a discrete system, which results in minimizing the processing load of the microcomputer and hence eliminating the need for using an expensive microcomputer having a high operation processing capacity.

[Mathematical formula 8]

$$iu\_kp = -\frac{1}{2} - \frac{\sqrt{3}}{2} \times \frac{1}{\tan(\theta x)} \quad (12)$$

$$iu\_est = iu\_kp \times iw\_sns \quad (13)$$

When the formula (11) or the formula (13) is referred to, in the case of calculating the U phase current estimated value iu_est by the use of the sensor phase reference current phase θx and the current sensed value iw_sns of the sensor phase, the current amplitude Ia is not used. Hence, in the current estimation, the current amplitude Ia does not need to be found and hence variables to be operated can be reduced.

The U phase current estimated value iu_est, which is calculated on the basis of the sensor phase reference current phase θx and the current sensed value iw_sns of the sensor phase, is outputted as a current estimated value (reference value) iu_est_ref of the estimated phase to the other phase current zero-crossing interpolation part 33.

Figure 6A:
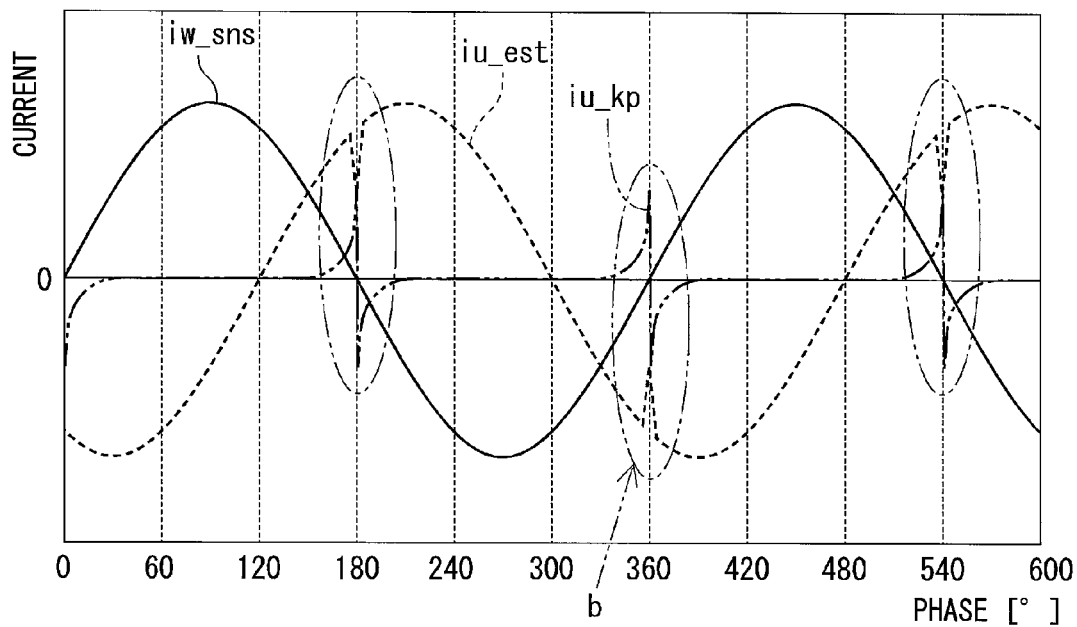
FIGS. 6A and 6B are waveform charts to illustrate a movement of another phase current estimated value when a sensor phase current crosses zero.
Figure 6B:
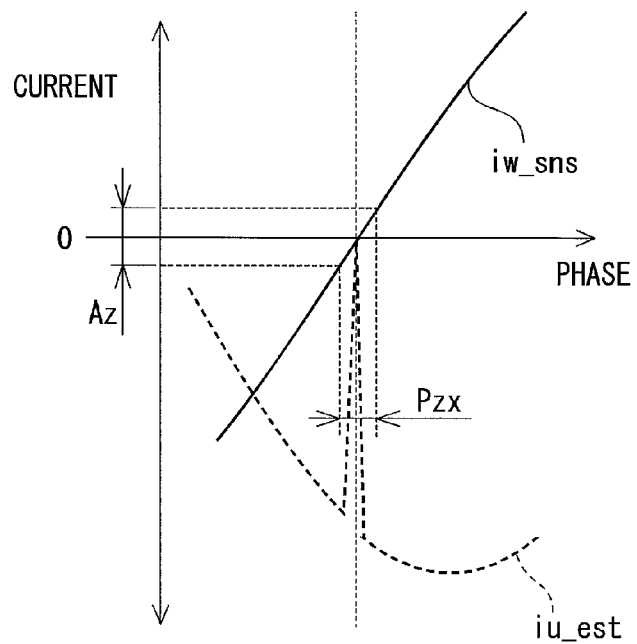

Here, as shown in FIGS. 6A and 6B, the current sensed value iw_sns of the sensor phase changes in the shape of a sine wave and interchanges between plus and minus across 0 [A] every phase of 180[°]. In this way, not only when the current sensed value iw_sns of the sensor phase is strictly 0 [A] but also when the current sensed value iw_sns of the sensor phase is within a specified range Az including 0 [A] is referred to as "when the sensor phase current crosses zero". Further, in the following descriptions, when the current value or the like includes not only a value of strict 0 but also a value within a range substantially equivalent to 0 in terms of a control operation in which a sensing error and the resolution of a device are taken into consideration, the current value or the like will be described as "zero".

"A value within a specified range Az including 0 [A]" means that an absolute value of the current sensed value iw_sns of the sensor phase is not more than a specified value or that an absolute value of the estimation coefficient iu_kp is not less than a specified value. Here, "a specified value" may be set by a current value of, for example, ±5 [A], or may be set on the basis of a resolution of, for example, 5 [LSB] in the discrete system, or may be set by a mathematical formula or the like. Further, since the current sensed value iw_sns of the sensor phase is synchronous with the sensor phase reference current phase θx, "a specified value" may be set by a value of the sensor phase reference current phase θx.

As shown in FIG. 6B, a state where the current sensed value iw_sns of the sensor phase is within the specified range Az corresponds to a zero-crossing phase range Pzx on a phase axis. The zero-crossing phase range Pzx can be also converted to "a zero-crossing period Tzx" (refer to FIG. 7 and the like, which will be described later) on a time axis. As for a method for converting the zero-crossing phase range Pzx to the time axis, any method may be used: for example, a method for calculating the number of revolutions of the AC motor 2 as a coefficient, and a method for measuring the time that elapses between two points of a starting point and an ending point of the zero-crossing phase range Pzx by a timer or the like in the microcomputer.

When the sensor phase current crosses zero, from the formula (5), an α axis current sensed value iα_sns becomes zero and a tangent tan (θx) of the sensor phase reference current phase θx becomes infinite in the formula (8). Then, when the current sensed value iw_sns of the sensor phase becomes zero or the tangent tan (θx) of the sensor phase reference current phase θx becomes infinite in the formula (11), "zero multiplication" of multiplying something by zero" is caused. Further, when the tangent tan (θx) of the sensor phase reference current phase θx becomes zero in the formula (11), "zero division" of dividing something by zero is caused. For this reason, the current estimated value iu_est of the U phase of the estimated phase might be varied.

Hence, in the present embodiment, the other phase current zero-crossing interpolation part 33 interpolates the current estimated value (reference value) iu_est_ref to thereby mask the zero division and the zero multiplication.

In this regard, as to the zero division, in order to prevent the current estimated value from being calculated to be an unintentional value by the effect of the discrete system in the formula (13), it is possible to take measures against the zero division also by setting a limited value for the estimated coefficient iu_kp or for a term of {1/tan (θx)} in the estimated coefficient iu_kp. Further, in the case where the control section 151 is mounted with the formula (13), it is also effective to map the estimated coefficient iu_kp or the term of {1/tan (θx)} of the estimated coefficient iu_kp. In this case, it is possible to take measures against the zero division also by setting a limited value in the map.

The other phase current zero-crossing interpolation part 33 includes a zero-crossing determination part 331 and a last value holding part 332. The zero-crossing determination part 331 determines whether or not the present time is the time "when the sensor phase current crosses zero". In other words, when the current sensed value iw_sns of the sensor phase is within the specified range Az including 0 [A], the zero-crossing determination part 331 determines that the present time is the time when the sensor current crosses zero.

In the case where the zero-crossing determination part 331 determines that the present time is not the time when the sensor phase current crosses zero, the zero-crossing determination part 331 outputs the current estimated value (reference value) iu_est_ref calculated by the other phase current reference value calculation part 32, as it is, as a current estimated value (fixed value) iu_est_fix to the dq transformation part 34.

On the other hand, in the case where the zero-crossing determination part 331 determines that the present time is the time when the sensor phase current crosses zero, the zero-crossing determination part 331 acquires a current estimated value (interpolated value) iu_est_cmp from the last value holding part 332 and outputs the current estimated value (interpolated value) iu_est_cmp as the current estimated value (fixed value) iu_est_fix to the dq transformation part 34.

The last value holding part 332 holds a value of the last time in advance, and in the case where the zero-crossing determination part 331 determines that the present time is the time when the sensor phase current crosses zero, the last value holding part 332 calculates the current estimated value (interpolated value) iu_est_cmp and outputs the current estimated value (interpolated value) iu_est_cmp to the zero-crossing determination part 331.

For example, the last value holding part 332 holds a specified number of nearest previous current estimated values (fixed values) iu_est_fix, which are calculated previously, as current estimated values (held values) iu_est_hld. Then, in the case where the zero-crossing determination part 331 determines that the present time is the time when the sensor phase current crosses zero, the last value holding part 332 makes the current estimated value (held value) iu_est_hld, which is a value of the last time or a value before the last time, the current estimated value (interpolated value) iu_est_cmp (hereinafter, this operation is referred to as "zero-crossing interpolate, or "zero-crossing interpolation") and outputs the current estimated value (interpolated value) iu_est_cmp to the zero-crossing determination part 331.

Further, for example, the last value holding part 332 holds a specified number of nearest previous d axis current estimated values id_est and q axis current estimated values iq_est, which are previously calculated by the dq transformation part 34, as d axis current estimated values (held values) id_est_hld and q axis current estimated values (held values) iq_est_hld. Then, in the case where the zero-crossing determination part 331 determines that the present time is the time when the sensor phase current crosses zero, the last value holding part 332 calculates a U phase estimated value as a current estimated value (interpolated value) iu_est_cmp by the inverse dq transformation of the d axis current estimated values (held values) id_est_hld and the q axis current estimated values (held values) iq_est_hld, which are the values of the last time or the values before the last time, and outputs the current estimated value (interpolated value) iu_est_cmp to the zero-crossing determination part 331.

In this way, when the sensor phase current crosses zero, by interpolating the current estimated value iu_est of the estimated phase, a sudden variation in the current estimated value iu_est of the estimated phase, which is caused by "the zero division" or the "zero multiplication" in the formula (11), can be avoided. In this regard, a method of zero-crossing interpolating the current estimated value iu_est of the estimated phase, which is performed by the other phase current zero-crossing interpolation part 33, may be a method other than the method described above, or the zero-crossing interpolation of the current estimated value iu_est of the estimated phase may be not performed as required.

The dq transformation part 34 calculates the d axis current estimated value id_est and the q axis current estimated value iq_est by the dq transformation by the use of the current estimated values (fixed values) iu_est_fix acquired from the other phase zero-crossing interpolation part 33, the current sensed value iw_sns of the sensor phase, and the electric angle θe. The calculation of the d axis current estimated value id_est and the q axis current estimated value iq_est in the dq transformation part 34 will be described. First, a general formula of the dq transformation will be shown in the following formula (14).

[Mathematical formula 9]

$$\begin{bmatrix} id\_est \\ iq\_est \end{bmatrix} = \sqrt{\frac{2}{3}} \begin{bmatrix} \cos(\theta e) & \cos(\theta e - 120°) & \cos(\theta e + 120°) \\ -\sin(\theta e) & -\sin(\theta e - 120°) & -\sin(\theta e + 120°) \end{bmatrix} \begin{bmatrix} iu \\ iv \\ iw \end{bmatrix} \quad (14)$$

Here, iv=−iu−iw by the Kirchhoff's law (refer to formula (3)), and when iu=iu_est and iw=iw_sns are substituted for the formula (14), the following formula (15) can be acquired. Here, in the present embodiment, the current estimated value (fixed value) iu_est_fix, which is zero-crossing interpolated, is used as the iu_est.

[Mathematical formula 10]

$$\begin{bmatrix} id\_est \\ iq\_est \end{bmatrix} = \sqrt{\frac{2}{3}} \begin{bmatrix} \cos(\theta e) - \cos(\theta e - 120°) & \cos(\theta e + 120°) - \cos(\theta e - 120°) \\ -\sin(\theta e) + \sin(\theta e - 120°) & -\sin(\theta e + 120°) + \sin(\theta e - 120°) \end{bmatrix} \begin{bmatrix} iu\_est \\ iw\_sns \end{bmatrix}$$

$$= \sqrt{\frac{2}{3}} \times \sqrt{3} \begin{bmatrix} \cos(\theta e + 30°) & -\cos(\theta e - 90°) \\ -\sin(\theta e + 30°) & \sin(\theta e - 90°) \end{bmatrix} \begin{bmatrix} iu\_est \\ iw\_sns \end{bmatrix}$$

$$= \sqrt{2} \begin{bmatrix} \sin(\theta e + 120°) & -\sin(\theta e) \\ \cos(\theta e + 120°) & -\cos(\theta e) \end{bmatrix} \begin{bmatrix} iu\_est \\ iw\_sns \end{bmatrix} \quad (15)$$

As shown in the formula (15), the d axis current estimated value id_est and the q axis current estimated value iq_est can be calculated by the dq transformation by the use of the current values (sensed values or estimated values) of two phases among three phases. Hence, the other phase current estimation part 31 needs to calculate only the current estimated value of one phase (U phase) among two phases other than the sensor phase and does not need to calculate the current estimated value of the other phase (V phase).

Returning to FIG. 3, the description will be made continuously. The current estimation part 301, as described above, estimates the d axis current estimated value id_est and the q axis current estimated value iq_est.

Incidentally, when the sensor phase current crosses zero, if the other phase current zero-crossing interpolation part 33 interpolates the current estimated value iu_est of the estimated phase, there is a possibility that the d axis current estimated value id_est and the q axis current estimated value iq_est are varied by the error of the current estimated value iu_est caused by the interpolation and hence that the current feedback control could be made unstable. Hence, the current estimated value zero-crossing interpolation part 28 zero-crossing interpolates the d axis current estimated value id_est and the q axis current estimated value iq_est apart from the zero-crossing interpolation relating to the current estimated value iu_est of the estimated phase, thereby preventing the d axis current estimated value id_est and the q axis current estimated value iq_est from being varied.

The current estimated value zero-crossing interpolation part 28 determines on the basis of the current sensed value iw_sns of the sensor phase and the electric angle θe whether or not the present time is the time when the sensor phase current crosses zero, as is the case with the zero-crossing determination part 331 of the other phase current zero-crossing interpolation part 33. Alternatively, the current estimated value zero-crossing interpolation part 28 may use the determination result of the zero-crossing determination part 331.

In the case where the current estimated value zero-crossing interpolation part 28 determines that the present time is not the time when the sensor phase current crosses zero, the current estimated value zero-crossing interpolation part 28 feeds back the d axis current estimated value id_est and the q axis current estimated value iq_est, which are operated by the current estimation part 301, as they are, as the d axis current estimated value (fixed value) id_est_fix and the q axis current estimated value (fixed value) iq_est_fix to the subtractor 22.

On the other hand, in the case where the current estimated value zero-crossing interpolation part 28 determines that the present time is the time when the sensor phase current crosses zero, the current estimated value zero-crossing interpolation part 28 fixes the d axis current estimated value id_est and the q axis current estimated value iq_est, which are estimated by the current estimation part 301, and feeds back the d axis current estimated value id_est and the q axis current estimated value iq_est, which are fixed, as the d axis current estimated value (fixed value) id_est_fix and the q axis current estimated value (fixed value) iq_est_fix to the subtractor 22.

When the d axis current estimated value id_est and the q axis current estimated value iq_est are fed back to the subtractor 22, the PI operation part 23 calculates the d axis voltage command value vd* and the q axis voltage command value vq* by the PI operation on the basis of the d axis current deviation Δid and the q axis current deviation Δiq.

A specific example in which the d axis current estimated value id_est and the q axis current estimated value iq_est are fixed, thereby being interpolated, will be described with reference to FIG. 7. A horizontal axis of FIG. 7 designates time and a vertical axis designates voltage. The time of the horizontal axis correlates to the sensor phase reference current phase θx. In other words, the zero-crossing phase range Pzx of FIG. 6B corresponds to "a zero-crossing period Tzx" from a time ts when the sensor phase current starts crossing zero till a time to when the sensor phase current finishes crossing zero.

Current values shown by solid lines are the d axis current estimated value id_est and the q axis current estimated value iq_est which are estimated by the current estimation part 301 in the time except for the zero-crossing period Tzx. In the zero-crossing period Tzx, the d axis current estimated value id_est and the q axis current estimated value iq_est at the time ts when the zero-crossing period Tzx starts are fixed as shown by broken lines and are employed as a d axis current estimated interpolated value id_est_cmp and a q axis current estimated interpolated value iq_est_cmp.

As values, at which the d axis current estimated value id_est and the q axis current estimated value iq_est are fixed, may be used values of the d axis current estimated value id_est and the q axis current estimated value iq_est in a cycle in which it is determined that the sensor phase current crosses zero, or the values of the d axis current estimated value id_est and the q axis current estimated value iq_est in a cycle just before when it is determined that the sensor phase current crosses zero or in a cycle before the cycle may be held as past values and the past values may be used as the values at which the d axis current estimated value id_est and the q axis current estimated value iq_est are fixed. Alternatively, other appropriate values may be used.

Next, a current estimation processing routine of the first embodiment will be described with reference to FIG. 8 and FIG. 9. In the description of the following flow charts, a symbol S designates "step". Further, as described above, in the present embodiment, a construction has been described by way of example in which the W phase is selected as the sensor phase from among three phases and in which the U phase is selected as the estimated phase in which the current is estimated, so that also in the description of the flow charts, the description will be made on the premise of the construction described above.

A current estimation routine is repeatedly performed at specified operation intervals during a period in which the power of the control section 151 is on. When the present routine is started, in the first step S10, the current sensed value iw_sns of the sensor phase, which is sensed by the current sensor 13, is acquired and the electric angle θe of the AC motor 2, which is sensed by the rotation angle sensor 14, is acquired.

Then, in the first embodiment, the reference value calculation part 32 of the other phase current estimation part 31 calculates the α axis current iα and the β axis current iβ in S22, S23 and then calculates the sensor phase reference current phase θx in S28.

In S22, the current command value iv* of the V phase is calculated by the electric angle θe of the AC motor 2 and by the inverse transformation based on the d axis current command value id* and the q axis current command value iq*. The V phase in this case is a phase which is not the estimated phase among two phases other than the sensor phase. Here, in the other embodiment, the current command values iu*, iv* of the U phase and the V phase may be calculated.

In S23, the α axis current iα_sns is calculated by the formula (5) by the use of the current sensed value iw_sns of the sensor phase.

In S24, the β axis current iβ_est is calculated by the formula (7) by the use of the current command value iv* of the other one phase and the current sensed value iw_sns of the sensor phase.

In S28, the sensor phase reference current phase θx is calculated by the formula (8) by the use of the α axis current iα and the β axis current iβ.

In S40, the current estimated value (reference value) iu_est_ref of the U phase is calculated by the formula (11) by the use of the sensor phase reference current phase θx and the current sensed value iw_sns of the sensor phase. At this time, the current estimated value (reference value) iu_est_ref of the U phase may be calculated by the formula (13) by the use of the estimated coefficient iu_kp, which is calculated by the formula (12) or is acquired from the map, and the current sensed value iw_sns of the sensor phase.

In S50, the other phase current zero-crossing interpolation part 33 performs interpolation processing when the sensor phase current crosses zero for the current estimated value (reference value) of the U phase. In a subordinate flow chart of FIG. 9, in S51, the zero-crossing determination part 331 determines whether or not the present time is the time when the sensor phase current crosses zero. This determination is made, for example, by determining whether or not the current sensed value iw_sns of the sensor phase is a value within the specified range Az including 0 [A].

In the case where it is determined in S51 that the present time is not the time when the sensor phase current crosses zero (NO), the routine proceeds to S52 where the current estimated value (reference value) iu_est_ref of the U phase, which is calculated in S40, is outputted as it is, as the current estimated value (fixed value) iu_est_fix of the U phase.

On the other hand, in the case where it is determined in S51 that the present time is the time when the sensor phase current crosses zero (YES), the routine proceeds to S54. In S54, the current estimated value (interpolated value) iu_est_cmp of the U phase is acquired from the last value holding part 332 and then the current estimated value (interpolated value) iu_est_cmp of the U phase is outputted as the current estimated value (fixed value) iu_est_fix of the U phase.

Returning to FIG. 8, in S60, the dq transformation part 34 dq transforms the current sensed value iw_sns of the sensor phase and the current estimated value iu_est of the U phase by the formula (15) on the basis of the electric angle θe to thereby calculate the d axis current estimated value id_est and the q axis current estimated value iq_est.

Next, in S81 to S83, the current estimated value zero-crossing interpolation part 28 performs interpolation processing of the d axis current estimated value id_est and the q axis current estimated value iq_est when the sensor phase current crosses zero.

In S81, it is determined whether or not the present time is the time when the sensor phase current crosses zero. The determination result of the S51 may be used as this determination.

In the case where it is determined that the present time is not the time when the sensor phase current crosses zero (S81: NO), the routine proceeds to S82. In S82, the d axis current estimated value id_est and the q axis current estimated value iq_est, which are estimated by the current estimation part 301, are outputted, as they are, as the d axis current estimated value (fixed value) id_est_fix and the q axis current estimated value (fixed value) iq_est_fix. Then, the routine is finished.

On the other hand, in the case where it is determined that the present time is the time when the sensor phase current crosses zero (S81: YES), the routine proceeds to S83. In S83, the d axis current estimated value id_est and the q axis current estimated value iq_est are fixed, and the d axis current estimated value id_est and the q axis current estimated value iq_est, which are fixed, are outputted as the d axis current estimated value (fixed value) id_est_fix and the q axis current estimated value (fixed value) iq_est_fix. Then, the routine is finished.

Figure 10:
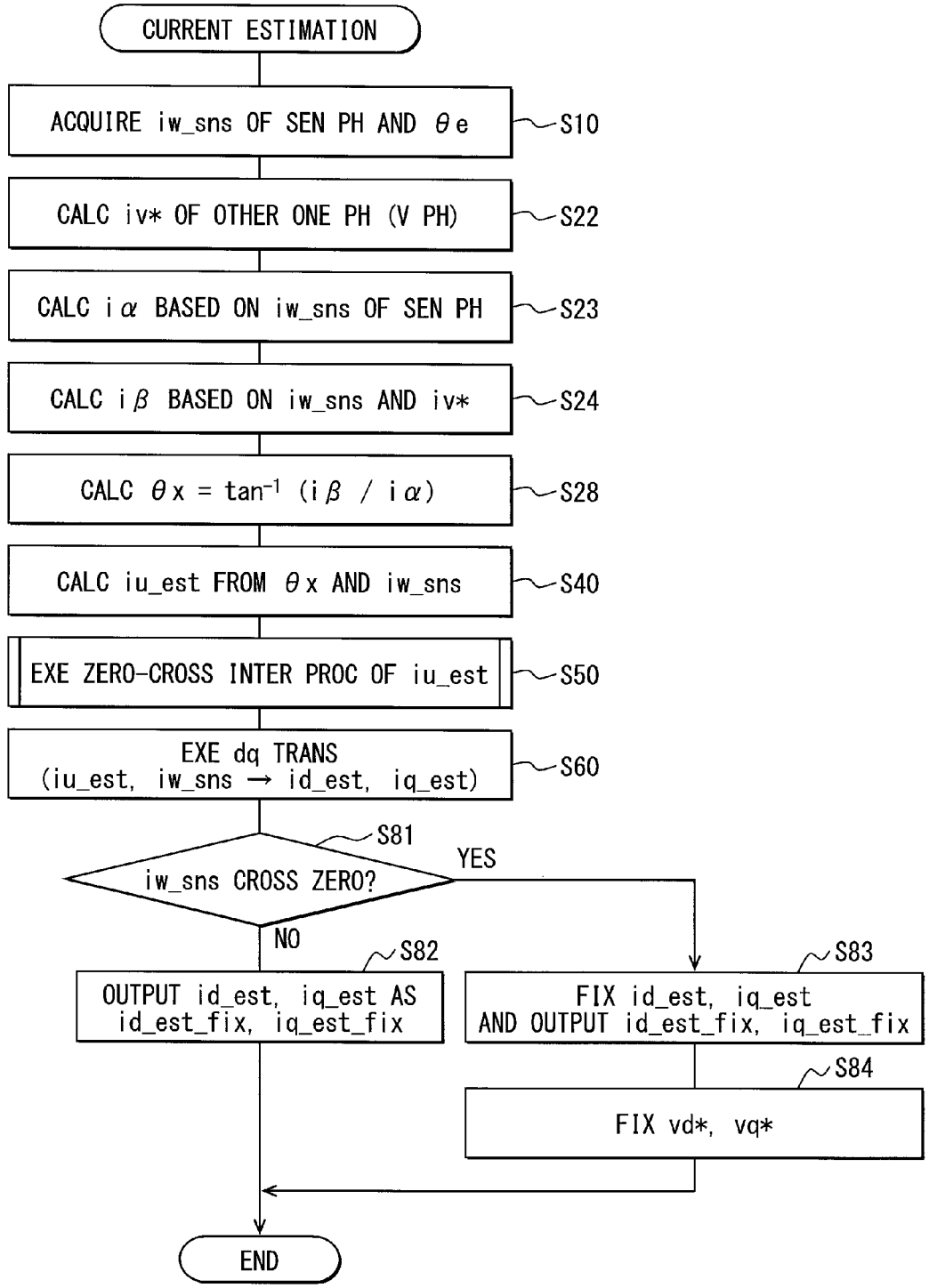
FIG. 10 is a flow chart of current estimation processing according to a modified example of the first embodiment.

Further, in a modified example shown by a flow chart of FIG. 10, in addition to S83, S84 for fixing the d axis voltage command value vd* and the q axis voltage command value vq*, which are operated by the PI operation part 23, is performed. Here, the d axis voltage command value vd* and the q axis voltage command value vq* correspond to "a command value relating to a voltage of an AC motor" in the current feedback mode.

The d axis voltage command value vd* and the q axis voltage command value vq* may be fixed by forcibly reducing the d axis current deviation Δid and the q axis current deviation Δiq to zero. Alternatively, the d axis voltage command value vd* and the q axis voltage command value vq* may be held at their values before the time is when the zero crossing period Tzx starts, thereby being fixed.

Effects of First Embodiment (1) The electric motor control device 10 of the present embodiment is a device for sensing a phase current of one phase among three phases by the current sensor 99 and for estimating phase currents of the other two phases. The current sensor 13 is provided only in the sensor phase and hence the number of the current sensor 13 can be reduced. In this way, a portion near a three-phase output terminal of the inverter 12 can be reduced in size and the cost of the electric motor control device 10 can be reduced.

Further, by reducing the number of the current sensor 13 to one, the effect of a gain error of the current sensor, which could be caused in a conventional control system of an AC motor using a plurality of current sensors, can be eliminated.

In this way, in the AC motor 2, an output torque variation caused by the gain error of the plurality of current sensors can be eliminated, which leads to eliminating a vehicle vibration, for example, in the case of an AC motor for a vehicle and to removing an element of reducing the product marketability of the vehicle.

(2) When a current flowing through the AC motor 2 is controlled by the current feedback control mode in the electric motor control device 10 having the current sensor 13 provided only in one phase, by interpolating the current estimated value iu_est of the estimated phase when the sensor phase current crosses zero, a state can be avoided in which calculation cannot be performed because of "the zero division" and "the zero multiplication" in the formula (11). Hence, it is possible to prevent the current estimated value iu_est of the estimated phase from being suddenly changed.

(3) When the sensor phase current crosses zero, by fixing the d axis current estimated value id_est and the q axis current estimated value iq_est, it is possible to prevent variations in the d axis current estimated value id_est and the q axis current estimated value iq_est. Hence, in the feedback control and the other control and determination performed by the use of the d axis current estimated value id_est and the q axis current estimated value iq_est, it is possible to avoid the effect of an erroneous determination and a malfunction.

(4) As a method other than the present embodiment for estimating the d axis current estimated value id_est and the q axis current estimated value iq_est when the sensor phase current crosses zero can be considered, for example, a method for dq transforming the current estimated value (fixed value) iu_est_fix, which is acquired by zero-crossing interpolating the current estimated value iu_est of the estimated value, and the current sensed value iw_sns of the sensor phase to thereby calculate the d axis current estimated value id_est and the q axis current estimated value iq_est. This method is a method for indirectly zero-crossing interpolating the d axis current estimated value id_est and the q axis current estimated value iq_est.

In contrast to this, the method of the present embodiment "directly" interpolates the d axis current estimated value id_est and the q axis current estimated value iq_est, which are estimated by the current estimation part 301, by the current estimated value zero-crossing interpolation part 28. Hence, as compared with the indirect interpolation method, the method of the present embodiment can prevent the variations in the d axis current estimated value id_est and the q axis current estimated value iq_est with more reliability.

(5) As is the case with the modified example (refer to FIG. 10), when the sensor phase current crosses zero, by fixing and interpolating the d axis voltage command value vd* and the q axis voltage command value vq* in addition to fixing the d axis current estimated value id_est and the q axis current estimated value iq_est, the current feedback control can be performed with more stability. In this regard, any one of the d axis voltage command value vd* and the q axis voltage command value vq* may be fixed.

(6) As a conventional technique for estimating the current of a phase other than the sensor phase in an electric motor control device having a current sensor provided only in one phase, the technique described in the patent document 1 (JP-A 2004-159391) is a technique for estimating the current of the phase other than the sensor phase on the basis of a d axis current command value and a q axis current command value.

By the way, a current vector of an AC motor follows a command current vector while changing with respect to a command current vector corresponding to a current command value by the effect of a control error and a feedback control. For this reason, there is caused "a difference" between an actual current phase and a command current phase and hence the command current phase does not become information reflecting the actual current phase with high accuracy. In this point, the conventional technique of the patent document 1 does never take the actual current phase into consideration and calculates the current estimated values of the other two phases by the use of a U phase current phase angle found from a command current phase angle. Hence, especially in the case where a change in torque and a change in rotation speed are required, as is the case with an AC motor for a vehicle, the current estimated values cannot be calculated with high accuracy, which causes a possibility that the control of the AC motor cannot be established.

In contrast to this, the current estimation part 301 of the present embodiment calculates the sensor phase reference current phase θx on the basis of the α axis current iα and the β axis current iβ in the fixed coordinate system (α-β coordinate system) based on the sensor phase and hence can calculate an actual current phase θx based on the sensor phase. Further, the current estimation part 301 of the present embodiment calculates the current estimated value iu_est of the estimated phase on the basis of the sensor phase reference current phase θx and the current sensed value iw_sns of the sensor phase and hence can calculate the current estimated value iu_est of the estimated phase with accuracy in consideration of the effects of the higher harmonic wave component of the actual current phase θx and variations usually developed.

(7) In the present embodiment in which the current flowing through the AC motor 2 is controlled by the use of the current feedback control mode, the β axis current iβ is calculated by the formula (6) or the formula (7) on the basis of two phase current values among the current command values iu*, iv* of the phases other than the sensor phase, which can be acquired by inverse dq transforming the d axis current command value id* and the q axis current command value iq*, and the current sensed value iw_sns of the sensor phase. In particular, it is preferable that the β axis current iβ is calculated by the formula (7) on the basis of the current command values iv* of one phase other than the sensor phase and the current sensed value iw_sns of the sensor phase.

In this case, in the α-β coordinate system, "a region in which the effect of the current sensed value is large and in which a calculation error of the sensor phase reference current phase θx is small" can be expanded. Hence, the effect of the current sensed value of the sensor phase can be included in the β axis current iβ. As a result, a calculation accuracy of the sensor phase reference current phase θx can be improved. In this way, periodic control variations in the d axis current and the q axis current can be reduced, and at a transient time when the current command values are changed or the like, a calculation accuracy of the current estimated value iu_est, in other words, convergence to a true value of the current estimated value iu_est can be improved.

Second Embodiment

Next, a control section 153 of a second embodiment of the present disclosure will be described with reference to FIG. 11 to FIG. 13. In the description of a control block diagram and a flow chart of the second embodiment, the substantially same constructions or the substantially same steps as the first embodiment will be denoted by the same reference symbols and their descriptions will be omitted.

A torque feedback control mode is a control mode of feeding back a torque estimated value tr_est to a torque command value trq*. Specifically, a square wave control mode of controlling a phase of a square wave voltage is known as a control mode of the torque feedback control mode (for example, refer to JP-A 2010-124544). Here, a square wave in this case means a waveform of one pulse in one cycle of current.

Figure 11:
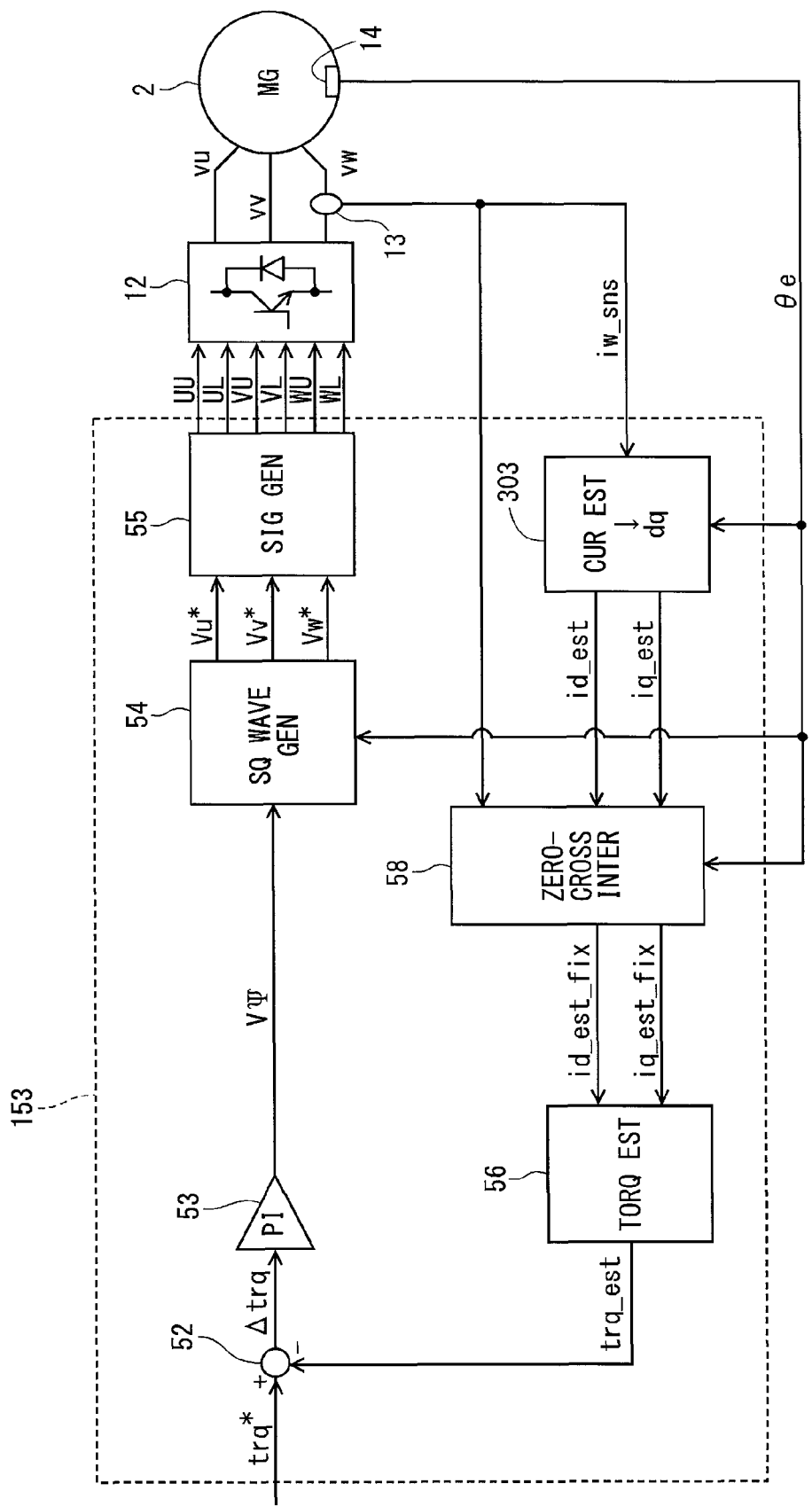
FIG. 11 is a block diagram to show a construction of a control section of a torque feedback control mode according to a second embodiment of the present disclosure.

As shown in FIG. 11, the control section 153 includes a torque subtractor 52, a PI operation part 53, a square wave generator 54, a signal generator 55, a current estimation part 303, a torque estimation part 56, and a voltage phase command value zero-crossing interpolation part 57 as "a zero-crossing interpolation means".

The torque subtractor 52 calculates a torque deviation Δtrq of a difference between a torque estimated value trq_est, which is fed back from the torque estimation part 56, and a torque command value trq*.

The PI operation part 53 calculates a voltage phase command value Vψ, which is a phase command value of a voltage vector, in such a way that the torque deviation Δtrq converges to 0 so as to make the torque estimated value trq_est follow the torque command value trq*.

The square wave generator 54 generates a square wave on the basis of the voltage phase command value Vψ and the electric angle θe and outputs a U phase voltage command value vu*, a V phase voltage command value vv*, and a W phase voltage command value vw*.

The signal generator 55 generates voltage command signals UU, UL, VU, VL, WU, WL, which relate to switching on/off the switching elements of the inverter 12, on the basis of the U phase voltage command value vu*, the V phase voltage command value vv*, and the W phase voltage command value vw* and outputs the generated voltage command signals UU, UL, VU, VL, WU, WL to the inverter 12.

The switching elements of the inverter 12 are switched on/off on the basis of the voltage command signals UU, UL, VU, VL, WU, WL, whereby three phase AC voltages vu, vv, vw are generated. Then, the three phase AC voltages vu, vv, vw are impressed on the AC motor 2 and hence the drive of the AC motor 2 is controlled so as to output torque corresponding to the torque command value trq*.

The current estimation part 303 estimates the d axis current estimated value id_est and the q axis current estimated value iq_est on the basis of the current sensed value iw_sns of the sensor phase, which is sensed by the current sensor 13, and the electric angle θe, which is acquired from the rotation angle sensor 14.

In the torque feedback control mode, unlike the current feedback control mode, the d axis current command value id* and the q axis current command value iq* or the current command values iu*, iv* of the phases (U phase and V phase) other than the sensor phase, which can be obtained by inverse dq transforming the d axis current command value id* and the q axis current command value iq*, cannot be used for the current estimation. Hence, the current estimation part 303 of the present embodiment estimates the d axis current estimated value id_est and the q axis current estimated value iq_est on the basis of the information on the current sensed value iw_sns of the sensor phase and the electric angle θe without using these current command values.

In particular, in the present embodiment, as is the case with the first embodiment, first, the other phase current estimation part calculates the current estimated value iu_est of the estimated phase by the use of the α-β coordinate system. Here, the present embodiment is characterized by focusing attention on that the α axis current iα and the β axis current iβ are in the relationship between "a sine wave and a cosine wave" and that a phase difference between the α axis current iα and the β axis current iβ is 90[°] and by calculating the β axis current iβ on the basis of a differential value Δiα of the α axis current. Then, the present embodiment is characterized by dq transforming the current sensed value iw_sns of the sensor phase and the current estimated value iu_est of the estimated phase to thereby calculate the d axis current estimated value id_est and the q axis current estimated value iq_est.

The differential value Δiα of the α axis current is calculated by the following formula (16) on the basis of "an amount of change in the α axis current iα to an electric angle movement Δθe [rad] between timings when the α axis current iα is calculated", that is, "a difference between a value of this time and a value of the last time of the α axis current iα".

$$\Delta i\alpha = -\{i\alpha(n) - i\alpha(n-1)\}/\Delta\theta e \quad (16)$$

Here, the electric angle movement Δθe is a value of expressing an electric angle movement from the current sensing timing of the last time to the current sensing timing of this time by a unit of radian. Further, iα (n) is the value of this time of the α axis current iα and iα (n−1) is the value of the last time of the α axis current iα.

In this regard, the current sensing timing may be set at "a switching timing", which is the timing when the switching elements of any one phase of the inverter 12 is switched on/off every electric angle 60[°], and at "an intermediate timing" between consecutive switching timings.

Further, in the case where an operation in the control section 153 is performed in a discrete system, the differential value Δiα of the α axis current iα is delayed by the half of the electric angle movement Δθe with respect to an actual β axis current iβ. It is preferable in consideration of this point that a correction amount H, which is obtained by multiplying an average value of the value of last time and the value of this time of the α axis current iα by the half of the electric angle movement Δθe (Δθe/2), is calculated from a formula (17) and that the correction amount H is added to the differential value Δiα of the α axis current iα by a formula (18).

$$H = \{i\alpha(n-1) + i\alpha(n)\}/2 \times (\Delta\theta e/2) \quad (17)$$

$$i\beta\_est = \Delta i\alpha + H \quad (18)$$

Then, the sensor phase reference current phase θx is calculated by the formula (8) by the use of the α axis current iα and the β axis current iβ. Here, in the case where a sign is reversed by the definition of the α axis current iα and the β axis current iβ in the formula (16), the sign may be operated if necessary in such a way as to be appropriate for the calculation of "$\tan^{-1}(i\beta/i\alpha)$" by the formula (8). Alternatively, in the case where as the result of the calculation, the sensor phase reference current phase θx is not synchronous with the current sensed value iw_sns of the sensor phase, not only the sign is operated but also a phase difference of 90[°] may be appropriately added to or subtracted from the calculated sensor phase reference current phase θx. This is the same as the current feedback control mode.

Further, it is assumed that the other phase current estimation part of the current estimation part 303 of the present embodiment has the same detailed construction as the other phase current estimation part 31 of the first embodiment shown in FIG. 4 except for a point that the other phase current reference value calculation part 32 has the d axis current command value id* and the q axis current command value iq* inputted thereto. The other phase current reference value calculation part 32 calculates the current estimated value (reference value) iu_est_ref of the estimated phase by the formula (11) or the formula (13) on the basis of the current sensed value iw_sns of the sensor phase and the sensor phase reference current phase θx. Then, when the sensor phase current crosses zero, the other phase current zero-crossing interpolation part 33 (refer to FIG. 4) zero-crossing interpolates the current estimated value iu_est of the estimated phase to thereby calculate the current estimated value (fixed value) iu_est_fix of the estimated phase.

When the current estimated value (fixed value) iu_est_fix of the estimated phase is calculated in this way, the current estimation part 303 calculates the d axis current estimated value id_est and the q axis current estimated value iq_est by the formula (15).

The current estimated value zero-crossing interpolation part 58 determines on the basis of the current sensed value iw_sns of the sensor phase and the electric angle θe whether or not the present time is the time when the sensor phase current crosses zero, as is the case with the zero-crossing determination part 331 of the other phase current zero-crossing interpolation part 33 (refer to FIG. 4). Alternatively, the current estimated value zero-crossing interpolation part 58 may use the determination result of the zero-crossing interpolation part 331.

In the case where the current estimated value zero-crossing interpolation part 58 determines that the present time is not the time when the sensor phase current crosses zero, the current estimated value zero-crossing interpolation part 58 outputs the d axis current estimated value id_est and the q axis current estimated value iq_est, which are estimated by the current estimation part 303, as they are, as the d axis current estimated value (fixed value) id_est_fix and the q axis current estimated value (fixed value) iq_est_fix to the torque estimation part 56.

On the other hand, in the case where the current estimated value zero-crossing interpolation part 58 determines that the present time is the time when the sensor phase current crosses zero, the current estimated value zero-crossing interpolation part 58 fixes the d axis current estimated value id_est and the q axis current estimated value iq_est, which are estimated by the current estimation part 303, and outputs the d axis current estimated value id_est and the q axis current estimated value iq_est, which are fixed, as the d axis current estimated value (fixed value) id_est_fix and the q axis current estimated value (fixed value) iq_est_fix to the torque estimation part 56.

Figure 7:
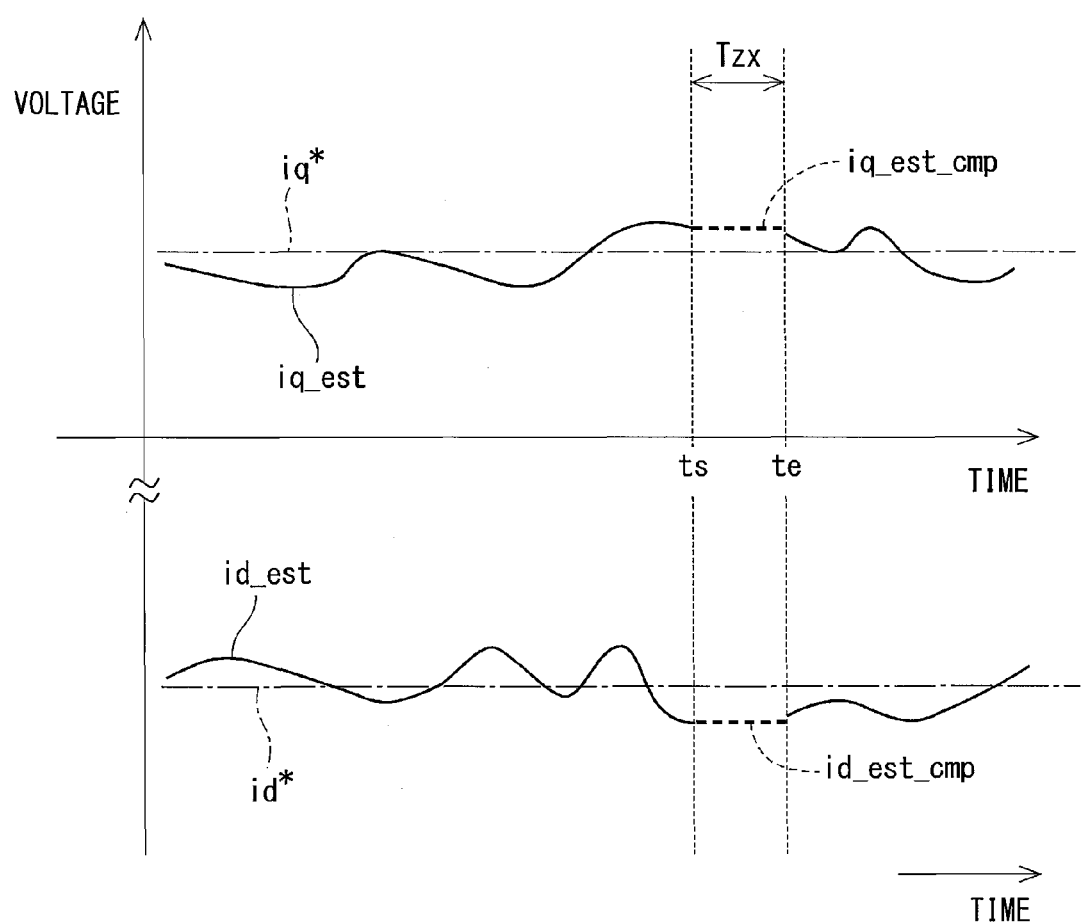
FIG. 7 is a schematic chart to show an example of interpolating a d axis voltage command value and a q axis voltage command value when a sensor phase current crosses zero.

Here, a specific example of interpolating the d axis current estimated value id_est and the q axis current estimated value iq_est by fixing the d axis current estimated value id_est and the q axis current estimated value iq_est is the same as FIG. 7 of the first embodiment.

The torque estimation part 56 operates the torque estimated value trq_est by a formula (19) or a map or the like on the basis of the d axis current estimated value id_est and the q axis current estimated value iq_est (omitted "_fix in the end), which are outputted as the fixed values from the current estimated value zero-crossing interpolation part 58, and feeds back the torque estimated value trq_est to the torque subtractor 52.

$$trq\_est = p \times \{iq\_est \times \psi + (Ld - Lq) \times id\_est \times iq\_est\} \quad (19)$$

Here, symbols are as follows:
p: number of pairs of poles of AC motor
Ld, Lq: d axis self inductance, q axis self inductance
ψ: armature interlinkage magnetic flux of permanent magnet Subsequently, a current estimation processing routine of the second embodiment will be described with reference to FIG. 12.

Figure 8:
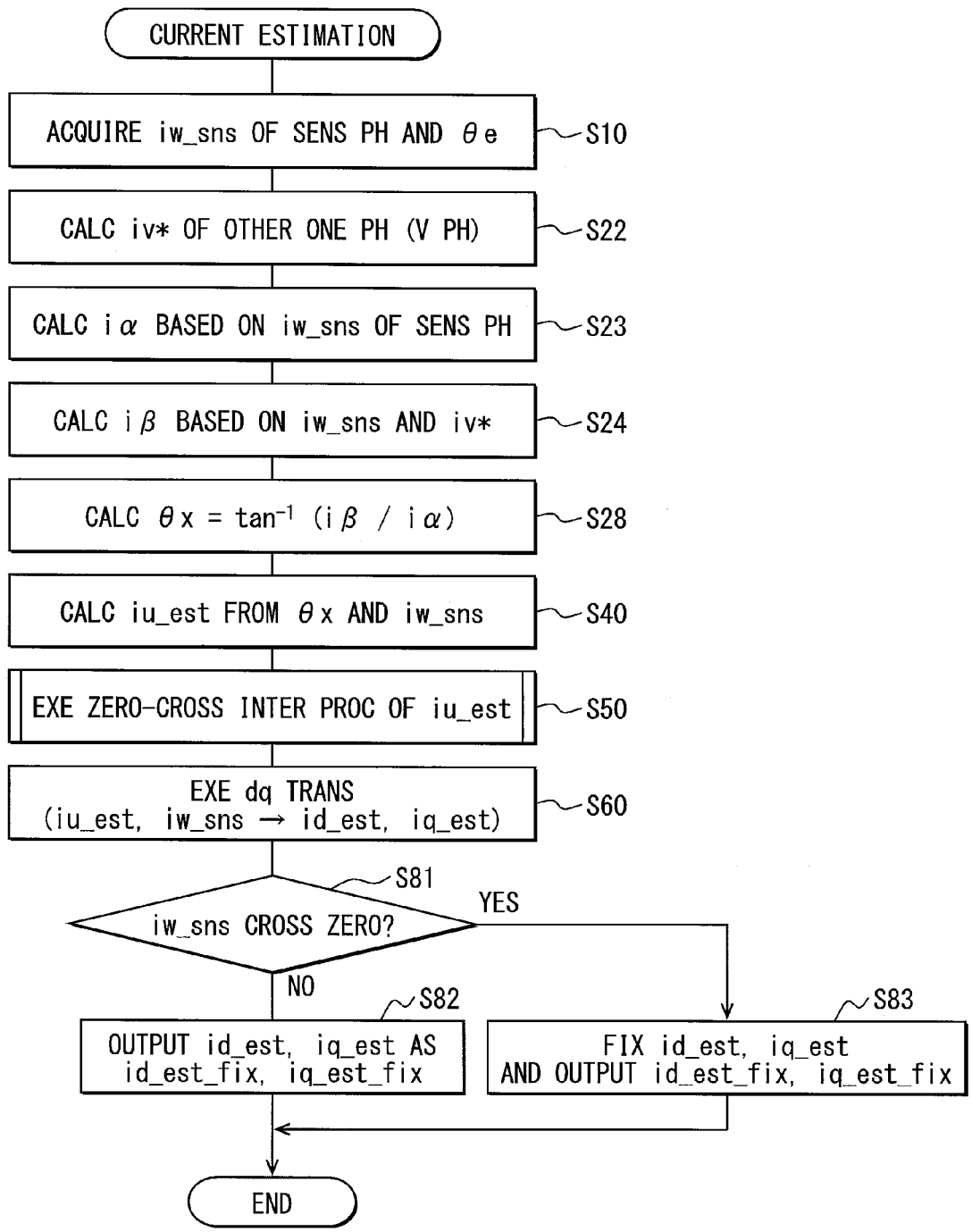
FIG. 8 is a flow chart of current estimation processing according to the first embodiment of the present disclosure.
Figure 9:
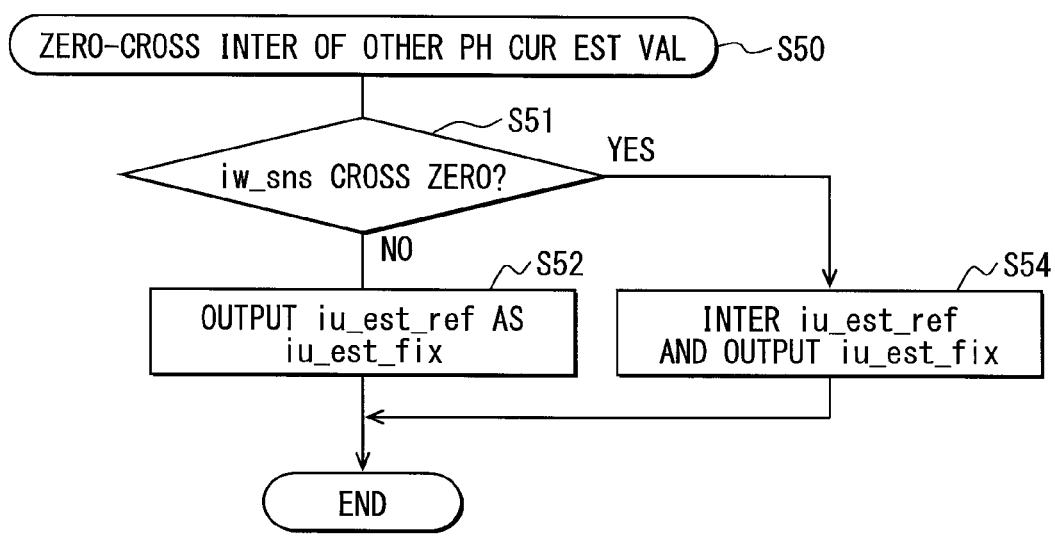
FIG. 9 is a subordinate flow chart of zero-crossing interpolation processing of another phase current estimated value.
Figure 12:
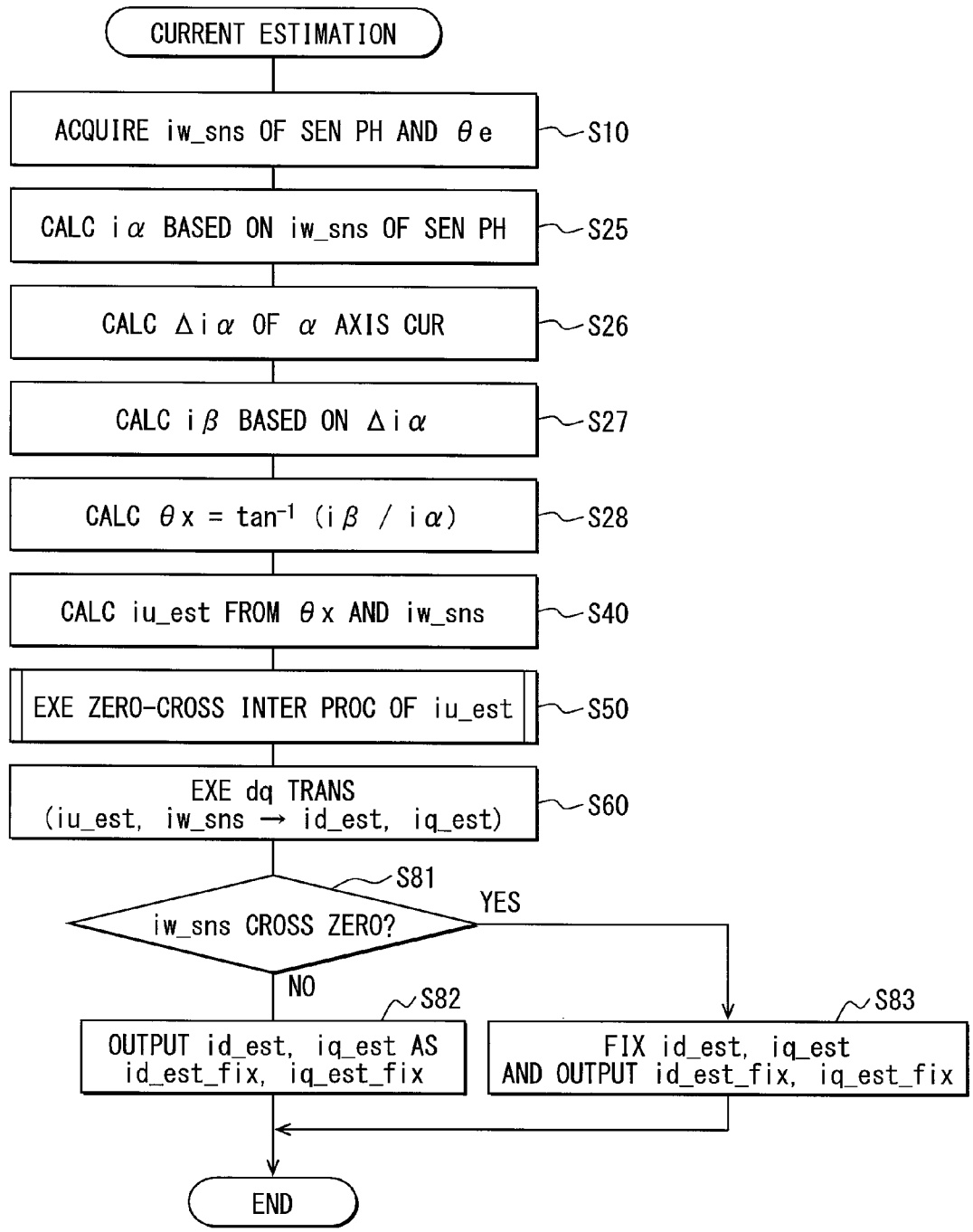
FIG. 12 is a flow chart of current estimation processing according to the second embodiment of the present disclosure.

A flow chart of FIG. 12 is different from the flow chart of FIG. 8 of the first embodiment only in a point that the α axis current iα and the β axis current iβ are calculated by S25 to S27 in place of S22 to S24.

In S25, the α axis current iα is calculated by the formula (5) by the use of the current sensed value iw_sns of the sensor phase.

In S26, the differential value Δiα of the α axis current iα is calculated by the formula (16) on the basis of a change amount of the α axis current iα to the electric angle movement Δθe between the current sensing timings of the α axis current iα.

In S27, the correction amount H is added to the differential value Δiα of the α axis current iα by the formulas (17), (18) to thereby calculate the β axis current estimated value iβ_est.

Figure 13:
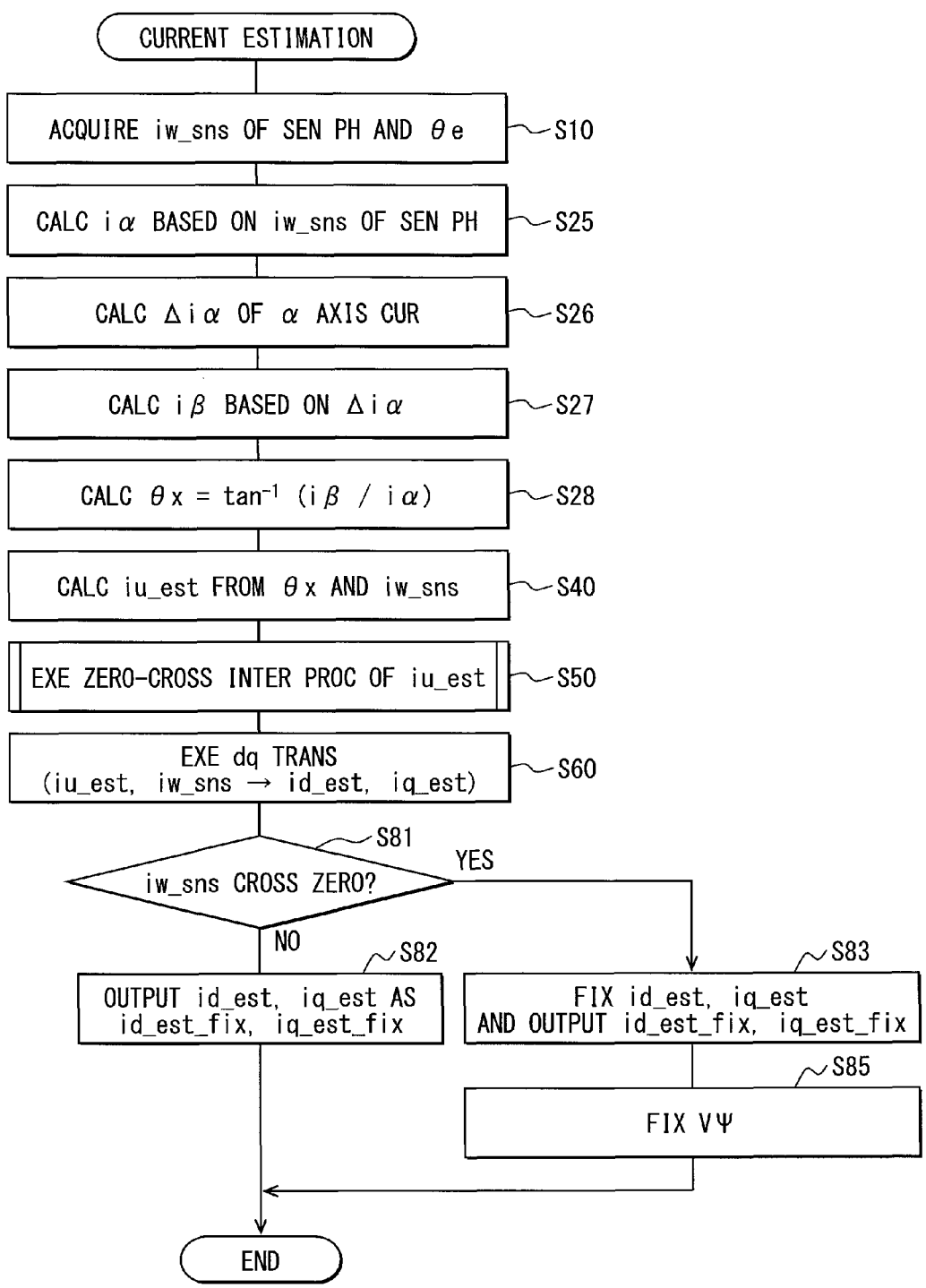
FIG. 13 is a flow chart of current estimation processing according to a modified example of the second embodiment.

In a modified example shown by a flow chart of FIG. 13, S85 of fixing a voltage phase command value Vψ is performed in correspondence to S84 of FIG. 10 of the first embodiment. Here, the voltage phase command value Vψ corresponds to "a command value relating to a voltage of an AC motor" in the torque feedback control mode.

The voltage phase command value Vψ may be fixed by forcibly reducing the torque deviation Δtrq to zero. Alternatively, the voltage phase command value Vψ may be held at the voltage before the time ts when the zero-crossing period Tzx starts, thereby being fixed.

Effect of Second Embodiment

The second embodiment has the effects (1) to (4) of the first embodiment in common and has the following effect (5') in place of the effect (5) of the first embodiment. Further, the second embodiment has an effect (8) specific to the second embodiment.

(5') As is the case with the modified example (refer to FIG. 13), when the sensor phase current crosses zero, by fixing and interpolating the voltage phase command value Vψ in addition to fixing the d axis current estimated value id_est and the q axis current estimated value iq_est, the torque feedback control can be performed with more stability.

(8) In the present embodiment, when the control section 153 performs the torque feedback control mode, the β axis current iβ can be calculated on the basis of the differential value Δiα of the α axis current iα without using the current command values iu*, iv* of the other phases. Hence, also in the torque feedback control mode, an optimal current estimation by the α-β coordinate system can be performed as is the case with the current feedback control mode.

Other Embodiments (A) A method by which the current estimation means estimates the current estimated value iu(v)_est of the estimated phase, the d axis current estimated value id_est, and the q axis current estimated value iq_est on the basis of the current sensed value iw_sns of the sensor phase of one phase and the electric angle θe is not limited to the method based on the α axis current iα and the β axis current iβ in the α-β coordinate system as the embodiment described above.

For example, in a current estimation method using a current command value, the technique of the JP-A 2004-159391 (patent document 1) of a conventional technique may be employed if it can be understood that the effect (6) of the first embodiment cannot be obtained.

Further, it is also recommended to employ a current estimation method that estimates a d-axis current estimated value id_est and a q axis current estimated value iq_est without estimating a current estimated value of a phase other than a sensor phase on the basis of the current sensed value iw_sns of a sensor phase of one phase and the electric angle θe and that could cause "the zero division" or "the zero multiplication" in an estimation operation for a specified phase or at a specified timing.

A current estimation part of employing this method is constructed in such a way as to, first, estimate the d axis current estimated value id_est and the q axis current estimated value iq_est and then to calculate a current estimated value of the other phase by the inverse dq transformation, as required.

(B) The sensor phase for sensing the sensor current by the current sensor may be not only the W phase of the embodiment described above but also the U phase or the V phase. Further, the estimated phase for calculating the current estimated value from the current sensed value of the sensor phase and the sensor phase reference current phase θx may be not only the U phase of the embodiment described above but also the V phase or the W phase.

(C) "The current feedback control mode" is not limited to the sine wave PWM control mode or the overmodulated PWM control mode but may be any control mode of using a current command value and feeding back a current sensed value or a current estimated value based on the current sensed value to the current command value.

Further, "the torque feedback control mode" is not limited to the square wave control mode of the embodiment described above but may be any control mode of feeding back a torque estimated value based on the current sensed value relating to the drive of an AC motor to the torque command value.

(D) The AC motor of the embodiments described above is the three-phase AC motor of a permanent magnet synchronous type but may be an induction motor or another synchronous motor in the other embodiments. Further, the AC motor of the embodiments described above may be the so-called motor generator having a function as an electric motor and a function as a generator but may be not have the function as the generator in the other embodiment.

(E) The control device of the AC motor according to the present disclosure is not limitedly applied to the system having one set of an inverter and an AC motor as the embodiments described above but may be applied to a system having two sets of an inverter and an AC motor. Further, the control device of the AC motor according to the present disclosure may be applied to a system of an electric train having a plurality of AC motors connected in parallel to one inverter.

(F) The control device of the AC motor according to the present disclosure is not limitedly applied to the AC motor of the hybrid vehicle having the construction shown in FIG. 1 but may be applied to an AC motor of an electrically driven vehicle having any construction. Further, the control device of the AC motor according to the present disclosure may be applied to an AC motor other than the AC motor of the electrically driven vehicle.

The above disclosure has the following aspects.

According to an aspect of the present disclosure, a control device of a three phase AC motor includes: an inverter for driving the AC motor; a current sensor for sensing a current flowing in a sensor phase among three phases of the AC motor as a sensor phase current; and a controller for switching on and off a plurality of switching elements, which provide the inverter, in order to control a current flowing through the AC motor. The controller includes: a current estimation device for estimating a d-axis current estimated value and a q-axis current estimated value based on the sensor phase current and an electric angle of the AC motor; and a zero-crossing interpolation device for interpolating the d-axis current estimated value and the q-axis current estimated value, which are estimated by the current estimation device, by fixing the d-axis current estimated value and the q-axis current estimated value when the sensor phase current is in a zero cross range, which includes a zero point, so that the sensor phase current crosses the zero point, and for outputting an interpolated d-axis current estimated value and an interpolated q-axis current estimated value values as a fixed d-axis value and a fixed q-axis value, which are used for a feedback control relating to the current flowing through the AC motor.

Here, "the AC motor" includes an AC-driven motor, a generator, and a motor generator. For example, a motor generator that is used as a main unit of a hybrid vehicle and an electric vehicle and that generates a torque for driving driving wheels corresponds to "the AC motor". Further, for example, an electric motor control device for driving the motor generator corresponds to "a control device of an AC motor".

As a specific example of "a feedback control relating to a current flowing through the AC motor", in a current feedback control mode, the fixed values themselves acquired by fixing the d axis current estimated value and the q axis current estimated value, which are outputted by the zero-crossing means, are fed back to a d axis current command value and a q axis current command value. Further, in a torque feedback control mode, a torque estimated value is calculated on the basis of the fixed values of the d axis current estimated value and the q axis current estimated value, which are outputted by the zero-crossing interpolation means, and the torque estimated value is fed back to a torque command value.

As values, at which the d axis current estimated value and the q axis current estimated value are fixed, may be used values of the d axis current estimated value and the q axis current estimated value in a cycle in which it is determined that the sensor phase current crosses zero, or the values of the d axis current estimated value and the q axis current estimated value in a cycle just before when it is determined that the sensor phase current crosses zero or in a cycle before the cycle may be held as past values and the past values may be used as the values at which the d axis current estimated value and the q axis current estimated value are fixed. Alternatively, other appropriate values may be used.

According to the present disclosure, when the sensor phase current crosses zero, the d axis current estimated value and the q axis estimated value are interpolated, so that it is possible to prevent "zero division" of dividing something by 0 or "zero multiplication" of multiplying something by 0 from being caused in a current estimation formula. Hence, it is possible to prevent the current estimated values from being varied when the sensor phase current crosses zero.

"When the sensor phase current crosses zero, the zero-crossing interpolation means fixes the d axis current estimated value and the q axis current estimated value which are estimated by the current estimation means" means that the zero-crossing interpolation means outputs the d axis current estimated value and the q axis current estimated value, which are fixed, as fixed values in place of the d axis current estimated value and the q axis current estimated value, which are newly estimated by the current estimation means at an operation timing in a zero-crossing period. Further, this construction means that the zero-crossing interpolation means "directly" interpolates the d axis current estimated value and the q axis current estimated value, which are operated by the current estimation means. In other words, this construction means to exclude, for example, a construction in which the zero-crossing interpolation means zero-crossing interpolates the d axis current estimated value and q axis estimated value indirectly by dq transforming the phase current estimated value, which is zero-crossing interpolated in a former stage.

By zero-crossing interpolating the d axis current estimated value and the q axis current estimated value "directly", it is possible to prevent the d axis current estimated value and the q axis current estimated value from being varied with more reliability as compared with a case where the d axis current estimated value and the q axis current estimated value are indirectly interpolated. Hence, not only in the feedback control using the d axis current estimated value and the q axis current estimated value but also other control or determination performed by the use of the d axis current estimated value and the q axis current estimated value, it is possible to avoid the effect of an erroneous determination and a malfunction.

Alternatively, the current estimation device may further estimate a current estimated value of a phase other than the sensor phase as another phase current estimated value. When the sensor phase current is in the zero cross range, the current estimation device interpolates the another phase current estimated value.

Alternatively, when the sensor phase current is in the zero cross range, the controller controls the current flowing through the AC motor in such a manner that the controller feeds back the fixed d-axis value and the fixed q-axis value, which are output by the zero-crossing interpolation device, with respect to a d-axis current command value and a q-axis current command value.

Alternatively, when the sensor phase current is in the zero cross range, the controller calculates a torque estimated value based on the fixed d-axis value and the fixed q-axis value, which are output by the zero-crossing interpolation device, and controls the current flowing through the AC motor in such a manner that the controller feeds back the torque estimated value with respect to a torque command value.

Further, as described in the above cases, there are the following constructions in which the current estimation means "further estimates a current estimated value of a phase other than a sensor phase". A first construction is a construction in which: a current estimated value of a phase other than a sensor phase is calculated; and then the current sensed value of the sensor phase and the current estimated value of the other phase are dq transformed to thereby calculate a d axis current estimated value and a q axis current estimated value. A second construction is a construction in which: the d axis current estimated value and the q axis current estimated value are calculated; and then a current estimated value of the other phase is calculated by an inverse dq transformation. Further, a construction in which these constructions are combined to each other can be formed.

In this construction, when the sensor phase current crosses zero, preferably, the current estimated value of the other phase is further interpolated to thereby prevent the current estimated value of the other phase from being suddenly changed.

Alternatively, when the sensor phase current is in the zero cross range, the controller further fixes a command value relating to a voltage of the AC motor.

In addition, as described in the above case, when the sensor phase current crosses zero, the command value relating to the voltage of the AC motor may be fixed. "The d axis voltage command value and the q axis voltage command value" correspond to "the command value relating to the voltage of the AC motor" in the current feedback control mode, whereas "the voltage phase command value" corresponds to "the command value relating to the voltage of the AC motor" in the torque feedback control mode.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device of a three phase AC motor comprising:
   an inverter for driving the AC motor;
   a current sensor for sensing a current flowing in a sensor phase among three phases of the AC motor as a sensor phase current; and
   a controller for switching on and off a plurality of switching elements, which provide the inverter, in order to control a current flowing through the AC motor,
   wherein the controller includes:
      a current estimation device for estimating a d-axis current estimated value and a q-axis current estimated value based on the sensor phase current and an electric angle of the AC motor; and
      a zero-crossing interpolation device for interpolating the d-axis current estimated value and the q-axis current estimated value, which are estimated by the current estimation device, by fixing the d-axis current estimated value and the q-axis current estimated value when the sensor phase current is in a predetermined zero cross range, which includes a zero point, so that the sensor phase current crosses the zero point, and for outputting an interpolated d-axis current estimated value and an interpolated q-axis current estimated value values as a fixed d-axis value and a fixed q-axis value, which are used for a feedback control relating to the current flowing through the AC motor.

2. The control device of an AC motor according to claim 1, wherein the current estimation device further estimates a current estimated value of a phase other than the sensor phase as another phase current estimated value, and
   wherein, when the sensor phase current is in the zero cross range, the current estimation device interpolates the another phase current estimated value.

3. The control device of an AC motor according to claim 1, wherein, when the sensor phase current is in the zero cross range, the controller controls the current flowing through the AC motor in such a manner that the controller feeds back the fixed d-axis value and the fixed q-axis value, which are output by the zero-crossing interpolation device, with respect to a d-axis current command value and a q-axis current command value.

4. The control device of an AC motor according to claim 3, wherein, when the sensor phase current is in the zero cross range, the controller further fixes a command value relating to a voltage of the AC motor.

5. The control device of an AC motor according to claim 1, wherein, when the sensor phase current is in the zero cross range, the controller calculates a torque estimated value based on the fixed d-axis value and the fixed q-axis value, which are output by the zero-crossing interpolation device, and controls the current flowing through the AC motor in such a manner that the controller feeds back the torque estimated value with respect to a torque command value.

* * * * *